(12) United States Patent
Makino et al.

(10) Patent No.: US 11,468,661 B2
(45) Date of Patent: Oct. 11, 2022

(54) IMAGE MATCHING DEVICE

(71) Applicant: NEC CORPORATION, Tokyo (JP)

(72) Inventors: Kengo Makino, Tokyo (JP); Toru Takahashi, Tokyo (JP); Rui Ishiyama, Tokyo (JP); Yuta Kudo, Tokyo (JP)

(73) Assignee: NEC CORPORATION, Tokyo (JP)

( * ) Notice: Subject to any disclaimer, the term of this patent is extended or adjusted under 35 U.S.C. 154(b) by 64 days.

(21) Appl. No.: 16/977,130

(22) PCT Filed: Mar. 5, 2018

(86) PCT No.: PCT/JP2018/008245
§ 371 (c)(1),
(2) Date: Sep. 1, 2020

(87) PCT Pub. No.: WO2019/171413
PCT Pub. Date: Sep. 12, 2019

(65) Prior Publication Data
US 2021/0049399 A1  Feb. 18, 2021

(51) Int. Cl.
*G06K 9/62* (2022.01)
*G06V 10/44* (2022.01)
(Continued)

(52) U.S. Cl.
CPC ......... *G06V 10/443* (2022.01); *G06K 9/6232* (2013.01); *G06V 10/751* (2022.01); *G06V 30/2504* (2022.01)

(58) Field of Classification Search
CPC .... G06K 9/4609; G06K 9/522; G06K 9/6202; G06K 9/6232; G06K 9/6857; G06T 7/37
See application file for complete search history.

(56) References Cited

U.S. PATENT DOCUMENTS

| | | | | |
|---|---|---|---|---|
| 9,042,655 | B2* | 5/2015 | Sumitomo | H04N 13/239 382/191 |
| 2009/0274997 | A1* | 11/2009 | Kosuge | G06T 7/33 433/215 |

(Continued)

FOREIGN PATENT DOCUMENTS

| | | |
|---|---|---|
| EP | 1657681 A1 | 5/2006 |
| JP | 3468182 B2 | 11/2003 |

(Continued)

OTHER PUBLICATIONS

Extended European Search Report for EP Application No. EP18908538.4 dated Feb. 12, 2021.

(Continued)

*Primary Examiner* — Ian L Lemieux
(74) *Attorney, Agent, or Firm* — Sughrue Mion, PLLC

(57) ABSTRACT

An image matching device that performs matching between a first image and a second image includes: a frequency characteristic acquisition unit configured to acquire a frequency characteristic of the first image and a frequency characteristic of the second image; a frequency characteristic synthesizing unit configured to synthesize the frequency characteristic of the first image and the frequency characteristic of the second image to generate a synthesized frequency characteristic; a determination unit configured to perform frequency transformation on the synthesized frequency characteristic to calculate a correlation coefficient map whose resolution coincides with a target resolution, and perform matching between the first image and the second image based on a matching score calculated from the correlation coefficient map; and a regulation unit configured to regulate the target resolution based on the matching score.

13 Claims, 18 Drawing Sheets

(51) Int. Cl.
*G06V 10/75* (2022.01)
*G06V 30/24* (2022.01)

(56) References Cited

U.S. PATENT DOCUMENTS

| | | | | |
|---|---|---|---|---|
| 2010/0086220 | A1* | 4/2010 | Minear | G06K 9/741 |
| | | | | 382/218 |
| 2011/0188705 | A1* | 8/2011 | Tabaru | G06K 9/00 |
| | | | | 382/103 |
| 2011/0229056 | A1* | 9/2011 | Robertson | G06T 7/248 |
| | | | | 382/294 |
| 2012/0076435 | A1* | 3/2012 | Sharma | G06K 9/6206 |
| | | | | 382/277 |
| 2012/0288164 | A1 | 11/2012 | Nagashima et al. | |
| 2014/0147049 | A1 | 5/2014 | Sumitomo et al. | |
| 2015/0071565 | A1* | 3/2015 | Sharma | G06K 9/6206 |
| | | | | 382/276 |
| 2019/0378285 | A1* | 12/2019 | Niskanen | G06T 5/50 |
| 2020/0242397 | A1* | 7/2020 | Ishiyama | G06K 9/4638 |
| 2021/0256254 | A1* | 8/2021 | Takahashi | G06F 17/156 |

FOREIGN PATENT DOCUMENTS

| | | |
|---|---|---|
| JP | 2008-015848 A | 1/2008 |
| JP | 2011-170519 A | 9/2011 |
| JP | 2012-238060 A | 12/2012 |

OTHER PUBLICATIONS

Gottesfeld Brown L: "A Survey of Image Registration Techniques", ACM Computing Surveys, ACM, New York, NY, US, vol. 24, No. 4, Dec. 1, 1992 (Dec. 1, 1992), pp. 325-376, XP002942558.

Kenji Takita et al., "High-Accuracy Subpixel Image Registration Based on Phase-Only Correlation", IEICE Trans. Fundamentals, Aug. 2003, pp. 1925-1934, vol. E86-A, No. 8.

Koichi Ito et al., "A Fingerprint Matching Algorithm Using Phase-Only Correlation", IEICE Trans. Fundamentals, Mar. 2004, pp. 682-691, vol. E87-A, No. 3.

International Search Report of PCT/JP2018/008245 dated May 29, 2018 [PCT/ISA/210].

* cited by examiner

FIG. 6

$$F(k_1,k_2) = \sum_{n_1,n_2} f(n_1,n_2) W_{N_1}^{k_1 n_1} W_{N_2}^{k_2 n_2}$$

$$= A_F(k_1,k_2) e^{j\theta_F(k_1,k_2)} \quad \cdots \cdots (1)$$

$$G(k_1,k_2) = \sum_{n_1,n_2} g(n_1,n_2) W_{N_1}^{k_1 n_1} W_{N_2}^{k_2 n_2}$$

$$= A_G(k_1,k_2) e^{j\theta_G(k_1,k_2)} \quad \cdots \cdots (2)$$

$$W_{N_1} = e^{-j\frac{2\pi}{N_1}} \quad \cdots \cdots \cdots \cdots (3)$$

$$W_{N_2} = e^{-j\frac{2\pi}{N_2}} \quad \cdots \cdots \cdots \cdots (4)$$

$$\sum_{n_1,n_2} = \sum_{n_1=-M_1}^{M_1} \sum_{n_2=-M_2}^{M_2} \quad \cdots \cdots \cdots \cdots (5)$$

FIG. 7

$$\hat{R}(k_1, k_2) = \frac{F(k_1, k_2)\overline{G(k_1, k_2)}}{|F(k_1, k_2)\overline{G(k_1, k_2)}|}$$

$$= e^{j(\theta_F(k_1, k_2) - \theta_G(k_1, k_2))} \quad \cdots \cdots (6)$$

FIG. 8

$$F(k_1,k_2) = A_F(k_1,k_2)e^{j\theta_F(k_1,k_2)} \quad \cdots \cdots (7)$$

$$G(k_1,k_2) = A_G(k_1,k_2)e^{j\theta_G(k_1,k_2)}$$
$$\cong F(k_1,k_2)e^{-j\frac{2\pi}{N_1}k_1\delta_1}e^{-j\frac{2\pi}{N_2}k_2\delta_2} \quad \cdots (8)$$

$$\hat{R}(k_1,k_2) = \frac{F(k_1,k_2)\overline{G(k_1,k_2)}}{|F(k_1,k_2)\overline{G(k_1,k_2)}|}$$
$$\cong e^{j\frac{2\pi}{N_1}k_1\delta_1}e^{-j\frac{2\pi}{N_2}k_2\delta_2} \quad \cdots \cdots (9)$$

FIG. 9

$$\hat{r}(n_1,n_2) = \frac{1}{N_1 N_2} \sum_{k_1=M_1}^{M_1} \sum_{k_2=M_2}^{M_2} \hat{R}(k_1,k_2) W_{N_1}^{-k_1 n_1} W_{N_2}^{-k_2 n_2}$$

$$\cong \frac{1}{N_1 N_2} \frac{\sin\{\pi(n_1+\delta_1)\}}{\sin\{\frac{\pi}{N_1}(n_1+\delta_1)\}} \frac{\sin\{\pi(n_2+\delta_2)\}}{\sin\{\frac{\pi}{N_2}(n_2+\delta_2)\}} \quad \cdots (10)$$

IMAGE MATCHING DEVICE

CROSS REFERENCE TO RELATED APPLICATIONS

This application is a National Stage of International Application No. PCT/JP2018/008245, filed Mar. 5, 2018.

TECHNICAL FIELD

The present invention relates to an image matching device, an image matching method, and a program.

BACKGROUND ART

Various image matching methods for performing matching between a compared image and a registered image for the purpose of individual identification and so on have been proposed or put into practical use.

The phase-only correlation is a technique that can be used to position search between images and image matching.

A method for position search between images using the phase-only correlation is described in Non-Patent Document 1, for example.

Related techniques are described in Patent Documents 1 and 2, for example.

A method for image matching using the phase-only correlation is described in Non-Patent Document 2, for example.

In Non-Patent Document 2, the phase-only correlation is used for fingerprint image matching. In Non-Patent Document 2, a correlation coefficient map is calculated by the phase-only correlation, and it is determined whether fingerprints are identical fingerprints or different fingerprints depending on whether the maximum value in the correlation coefficient map exceeds a certain threshold value. Moreover, in Non-Patent Document 2, the capability of matching is increased by, in view of a property that high-frequency components in the frequency domain do not include important information, extracting only low-frequency components from a normalized cross power spectrum and performing the inverse Fourier transformation. Because unnecessary high-frequency components (corresponding to noise and the like) are removed by extraction of low-frequency components, there is an effect of avoiding occurrence of a correlation resulting from the high-frequency components. In other words, it is effective in robustness against noise and the like. Moreover, extraction of low-frequency components corresponds to decrease of the resolution of the inverse Fourier transformation, that is, decrease of the resolution of a correlation coefficient map, and the image size of the correlation coefficient to be output becomes smaller. Therefore, it is effective in reducing the amount of calculation.

In Non-Patent Document 2, a frequency band that is effective for a fingerprint image is calculated from the fingerprint image.

Patent Document 1: Japanese Unexamined Patent Application Publication No. JP-A 2008-015848
Patent Document 2: Japanese Patent Publication No. 3468182
Non-Patent Document 1: Kenji TAKITA et al., "High-Accuracy Subpixel Image Registration Based on Phase-Only Correlation", IEICE Trans. Fundamentals, vol. E86-A, No. 8 August 2003.
Non-Patent Document 2: Koich ITO et al., "A Fingerprint Matching Algorithm Using Phase-Only Correlation", IEICE Trans. Fundamentals, vol. E87-A, No. 3 March 2004.

As mentioned above, in image matching using the phase-only correlation, by previously determining a frequency band (low-frequency component) that is effective for an image to be compared and calculating a correlation value of only the frequency band (low-frequency component) from the image, robustness against noise and the like is ensured. Moreover, the resolution of a correlation coefficient map is regulated to be decreased to be the same as the resolution of a cross power spectrum of extracted low-frequency components.

That is to say, in the conventional technique, the resolution of a correlation coefficient map is determined to be the same based on the frequency of a feature value extracted from a cross power spectrum. In other words, the resolution of a correlation coefficient map is determined to be the same as the resolution of a cross power spectrum.

However, the resolution previously calculated from an image to be compared is not appropriate at all times. Therefore, it is desired to realize a method which can appropriately regulate the resolution of a correlation coefficient map separately from frequency components extracted from a cross power spectrum and the resolution thereof.

SUMMARY

An object of the present invention is to provide an image matching device that solves the abovementioned problem.

In order to achieve the object, an image matching device according to an aspect of the present invention is an image matching device that performs matching between a first image and a second image. The image matching device includes: a frequency characteristic acquisition unit configured to acquire a frequency characteristic of the first image and a frequency characteristic of the second image; a frequency characteristic synthesizing unit configured to synthesize the frequency characteristic of the first image and the frequency characteristic of the second image to generate a synthesized frequency characteristic; a determination unit configured to perform frequency transformation on the synthesized frequency characteristic to calculate a correlation coefficient map whose resolution coincides with a target resolution, and perform matching between the first image and the second image based on a matching score calculated from the correlation coefficient map; and a regulation unit configured to regulate the target resolution based on the matching score.

Further, an image matching method according to another aspect of the present invention is an image matching method for performing matching between a first image and a second image. The image matching method includes: acquiring a frequency characteristic of the first image and a frequency characteristic of the second image; synthesizing the frequency characteristic of the first image and the frequency characteristic of the second image to generate a synthesized frequency characteristic; performing frequency transformation on the synthesized frequency characteristic to calculate a correlation coefficient map whose resolution coincides with a target resolution; performing matching between the first image and the second image based on a matching score calculated from the correlation coefficient map; and regulating the target resolution based on the matching score.

Further, a computer program according to another aspect of the present invention includes instructions for causing a computer that performs matching between a first image and a second image to functions as: a frequency characteristic acquisition unit configured to acquire a frequency characteristic of the first image and a frequency characteristic of the second image; a frequency characteristic synthesizing unit configured to synthesize the frequency characteristic of the first image and the frequency characteristic of the second image to generate a synthesized frequency characteristic; a determination unit configured to perform frequency transformation on the synthesized frequency characteristic to calculate a correlation coefficient map whose resolution coincides with a target resolution, and perform matching between the first image and the second image based on a matching score calculated from the correlation coefficient map; and a regulation unit configured to regulate the target resolution based on the matching score.

With the configurations as described above, the present invention makes it possible to appropriately regulate the resolution of a correlation coefficient map.

BRIEF DESCRIPTION OF DRAWINGS

FIG. 6 is a view showing an example of equations showing the frequency characteristic of a first image and the frequency characteristic of a second image;

FIG. 7 is a view showing an example of an equation for calculating a normalized cross power spectrum;

FIG. 8 is a view showing an example of equations showing a frequency characteristic $F(k_1,k_2)$, a frequency characteristic $G(k_1,k_2)$ and a normalized cross power spectrum $R(k_1,k_2)$ of a pair of identical images with positional shift;

FIG. 9 is a view showing an example of an equation showing a correlation coefficient map $r(n_1,n_2)$ of the pair of identical images with positional shift;

EXAMPLE EMBODIMENTS

A first example embodiment of the present invention will be described.

<Problem to be Solved in this Example Embodiment>

In general, in the inverse Fourier transformation used in the process of the phase-only correlation, the amount of calculation depends on the resolution of a correlation coefficient map after transformation. Moreover, the accuracy of position estimation and matching also changes in accordance with the resolution.

For example, in a case where the resolution is set higher, the amount of calculation increases, and the accuracy increases. On the contrary, in a case where the resolution is set lower, the amount of calculation decreases, and the accuracy decreases.

Figure 17:
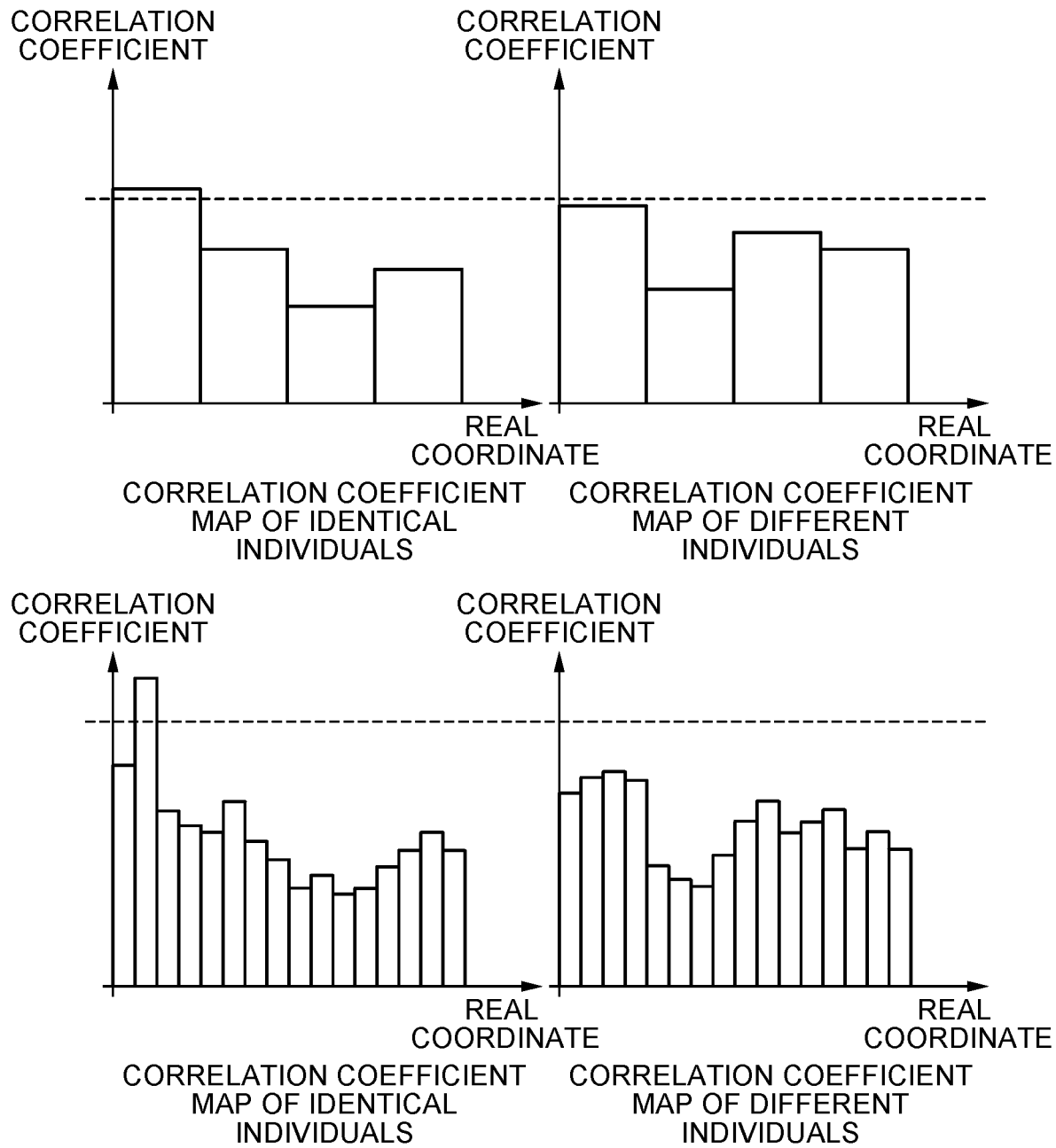
FIG. 17 is a schematic view for showing a difference of correlation coefficient maps obtained in the case of performing the inverse Fourier transformation with large resolution and small resolution.

FIG. 17 is a schematic view for showing a difference between correlation coefficient maps obtained in the case of performing the inverse Fourier transformation with high resolution and low resolution. In FIG. 17, assuming that there is a quadruple difference in the resolution as an example, the upper view shows a correlation coefficient map in a case where the resolution is low, and the lower view shows a correlation coefficient map in a case where the resolution is high. For demonstrating the difference in resolution, the scales of the horizontal axes are made to match. For example, in FIG. 17, there is a quadruple difference in the resolution, and therefore, the scales are made to match so that one pixel in the case of low resolution are equivalent to four pixels in the case of high resolution.

In a case where the resolution is low, compared with a case where the resolution is high, the maximum value of correlation decreases because the value of each pixel is the average value of the values of the pixel and pixels adjacent thereto. Therefore, for example, in the case of using the maximum value of correlation for matching, it is difficult to define a threshold value used for matching because there is no difference in the maximum value of correlation between the case of identical individuals and the case of different individuals. In other words, because the boundary for discrimination is ambiguous, matching may fail.

On the other hand, in a case where the resolution is high, the maximum value of correlation does not decrease due to the abovementioned reason or the like, and there is a difference in the maximum value of correlation between the case of identical individuals and the case of different individuals, so that it is easy to define a threshold value for matching. In other words, because the boundary for discrimination is clear, matching hardly fails.

It has been conventionally performed to regulate the resolution of transformation at the time of the inverse Fourier transformation as mentioned above in the phase-only correlation. For example, in Patent Document 1, first, a search target image and a template image are transformed into the frequency domain by the Fourier transformation. Next, a cross power spectrum is calculated from the respective complex spectrums of the search target image and the target image obtained by the transformation. Next, the cross power spectrum is normalized to only phase components by eliminating power components using a weight filter for each frequency. Next, by using the inverse Fourier transformation on the normalized cross power spectrum, a correlation coefficient on the real coordinate domain (correlation coefficient map) is calculated. Next, coordinates with the maximum values are detected from the calculated correlation coefficient map to perform position search. In the case of using the phase-only correlation in position search as in Non-Patent Document 1 and Patent Document 1, it is possible to perform position search with any position estimation accuracy by regulating the resolution. That is to say, in a case where a high position estimation accuracy, such as units of subpixels, is required, there is a need to increase the resolution. In Patent Document 2, instead of performing the inverse Fourier transformation, by performing a voting operation in a translation amount parameter space based on the cross power spectrum, a voting image is generated. Then, by detecting coordinates with the maximum values in the voting image, position search is performed. Increase of the resolution can be realized, as described in Patent Document 2, for example, by compensating the high-frequency component of the normalized cross power spectrum with the value of zero or the like. Meanwhile, in a case where the position estimation accuracy is not so required, such as a case where an estimation error of several pixels is allowable, the resolution may be decreased to calculate. Decrease of the resolution is realized by, for example, extracting and using only low-frequency components as mentioned with reference to Non-Patent Document 2. Thus, in the case of position search, it is possible to determine the resolution in accordance with a desired position search accuracy.

On the other hand, in the case of using the phase-only correlation for matching, regulation of the resolution is also effective as in Non-Patent Document 2. For example, as mentioned before, when the resolution is decreased, the image size of a correlation coefficient to be output becomes smaller, which makes it possible to reduce the amount of calculation. That is to say, by decreasing the resolution, it is possible to speedily perform matching. However, it is only when regulation of the resolution is appropriately performed. In Non-Patent Document 2, the resolution of a correlation coefficient map is previously calculated from an image to be compared. To be specific, the resolution of a correlation coefficient map is determined to be identical to the resolution of an extracted cross power spectrum. However, there is no guarantee that determining the resolution of a correlation coefficient map to be identical to the resolution of a cross power spectrum is not appropriate for matching at all times. If it is inappropriate, it is impossible to distinguish an identical individual from a different individual, which makes matching impossible. Therefore, it is desired to realize a method by which the resolution of a correlation coefficient map can be appropriately regulated.

According to the knowledge of the conventional technique, it is a standard that because a cross power spectrum corresponds to the frequency transform of a correlation coefficient map, only the minimum necessary resolution is required to obtain low-frequency components extracted in the cross power spectrum. This standard is an effective standard for the accuracy of matching when the frequency components of the original image include only the low-frequency components. However, in reality, the original image being compared includes higher-frequency components. Therefore, the maximum value of an original correlation coefficient map takes the maximum value in the resolution of the original image. That is to say, when the resolution is decreased to the resolution of the cross power spectrum from which low-frequency components are extracted later, the maximum value of correlation may be decreased too much.

Therefore, it is originally desired to, unlike in the conventional technique, set the resolution of a correlation coefficient map based on a standard that is the most appropriate for matching that makes it possible to stably detect the maximum value of a correlation coefficient map, separately from the resolution of a cross power spectrum. The present invention has been made based on this new finding as a method that can more appropriately regulate the resolution of a correlation coefficient map and can further reduce the data amount of feature values and the calculation amount while securing the matching accuracy.

<Object of this Example Embodiment>

An object of this example embodiment is to provide an image matching device, an image matching method and a program which makes it possible to automatically determine the resolution of a correlation coefficient map that is the minimum necessary for matching, separately from frequency and resolution extracted from a cross power spectrum, and speedily perform matching while securing the accuracy of matching.

<Configuration of this Example Embodiment>

Figure 1:
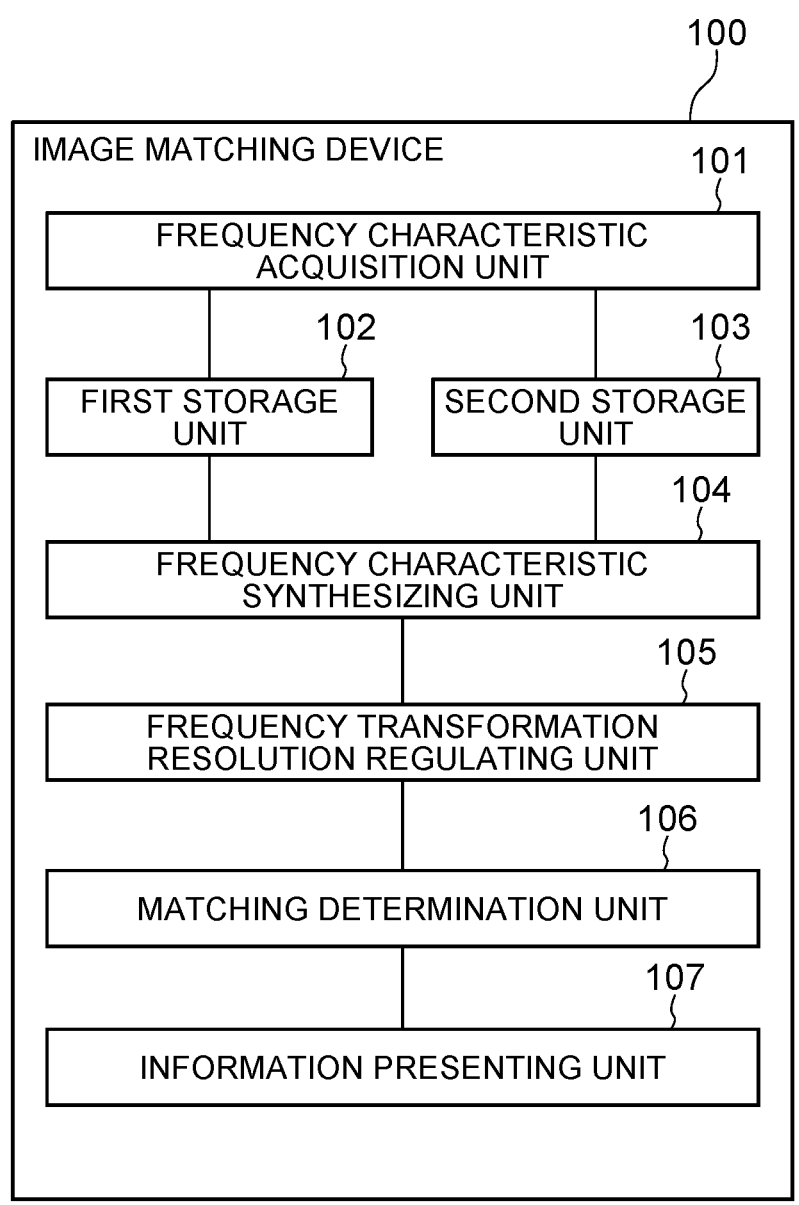
FIG. 1 is a block diagram of an image matching device according to a first example embodiment of the present invention.

FIG. 1 is a block diagram of an image matching device according to a first example embodiment of the present invention. An image matching device 100 according to this example embodiment is configured to perform matching between a first image and a second image.

Referring to FIG. 1, the image matching device 100 includes a frequency characteristic acquisition unit 101, a first storage unit 102, a second storage unit 103, a frequency characteristic synthesizing unit 104, a frequency transformation resolution regulating unit 105, a matching determination unit 106, and an information presenting unit 107.

The frequency characteristic acquisition unit 101 is configured to acquire the respective frequency characteristics of the first and second images. A frequency characteristic is two-dimensional data (two-dimensional array) that is the result of applying the Fourier transformation (discrete Fourier transformation) on an image to transform into the frequency domain.

Herein, the first image is a compared image obtained by capturing an object to be compared, for example. The second image is one of a plurality of registered images obtained by capturing a plurality of objects to be registered. The number of the second images may be one or plural. An object is, for example, an industrial product, a commercial product, and the like. On the surface of an object, there are naturally generated fine patterns that are generated in the same manufacturing process, such as fine irregularities, or patterns and random patterns on the material surface. By acquiring a difference in such patterns of the object surface as an image by a capture device such as a camera and recognizing the fine patterns, it is possible to perform individual identification and management of each product. This example embodiment relates to an image matching technique for such individual identification.

The first storage unit 102 is configured to store the frequency characteristic of the first image. The second storage unit 103 is configured to store the frequency characteristic of the second image.

The frequency characteristic synthesizing unit 104 is configured to calculate a normalized cross power spectrum of the frequency characteristic of the first image stored in the first storage unit 102 and the frequency characteristic of the second image stored in the second storage unit 103.

The frequency transformation resolution regulating unit 105 is configured to regulate the resolution of the inverse Fourier transformation (discrete Fourier transformation) when the matching determination unit 106 to be described later transforms a normalized cross power spectrum to a correlation coefficient map. Herein, the resolution of the inverse Fourier transformation has the same meaning as the resolution of a correlation coefficient map. The fact that the resolution of a correlation coefficient map is high or low is the same as that the size, that is, number of dimensions (number of pixels) of a correlation coefficient map is large or small. The size of a correlation coefficient map is determined based on the size of each dimension of the correlation coefficient map. The size of each dimension is determined based on the number of discrete frequency indexes. Therefore, regulating the maximum value of the discrete frequency indexes is one embodiment of a method of regulating the resolution.

The matching determination unit 106 is configured to, based on the resolution regulated by the frequency transformation resolution regulating unit 105, transform a normalized cross power spectrum to a correlation coefficient map by the inverse Fourier transformation. The matching determination unit 106 is also configured to calculate a score indicating the degree of similarity between the first image and the second image from the correlation coefficient map.

The information presenting unit 107 is configured to present the result of matching between the first image and the second image based on the result of determination by the matching determination unit 106. Presentation of the matching result may be displaying the matching result on a display device, or outputting a sheet of paper with the matching result printed thereon by a printing device, or transmitting a message with the matching result written therein to an external device by a communication device.

Figure 2:
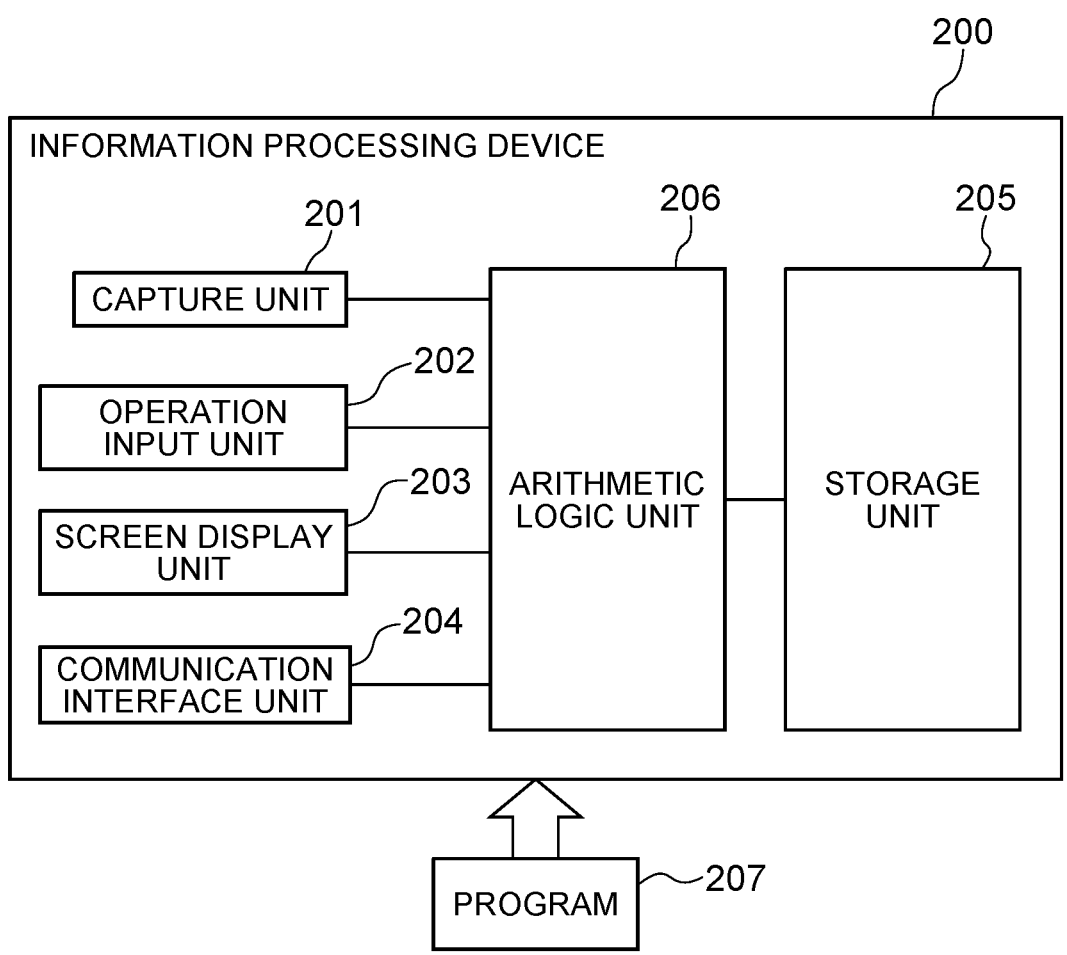
FIG. 2 is a block diagram showing an example of the hardware configuration of the image matching device according to the first example embodiment of the present invention.

For example, as shown in FIG. 2, the image matching device 100 can be realized by an information processing device 200 including a capture unit 201 such as a camera, an operation input unit 202 such as a keyboard and a mouse, a screen display unit 203 such as a liquid display, a communication interface unit 204, and a storage unit 205 such as a memory and a hard disk, and a program 207. The information processing device 200 may be, for example, a personal computer or a smartphone.

The program 207 is loaded to the memory from an external computer-readable storage medium, for example, when the information processing device 200 is started, and controls the operation of the arithmetic logic unit 206 to realize functional units on the arithmetic logic unit 206, such as the frequency characteristic acquisition unit 101, the first storage unit 102, the second storage unit 103, the frequency characteristic synthesizing unit 104, the frequency transformation resolution regulating unit 105, the matching determination unit 106, and the information presenting unit 107.

<Operation of this Example Embodiment>

Next, the overview of the operation of the image matching device 100 according to this example embodiment will be described.

Figure 3:
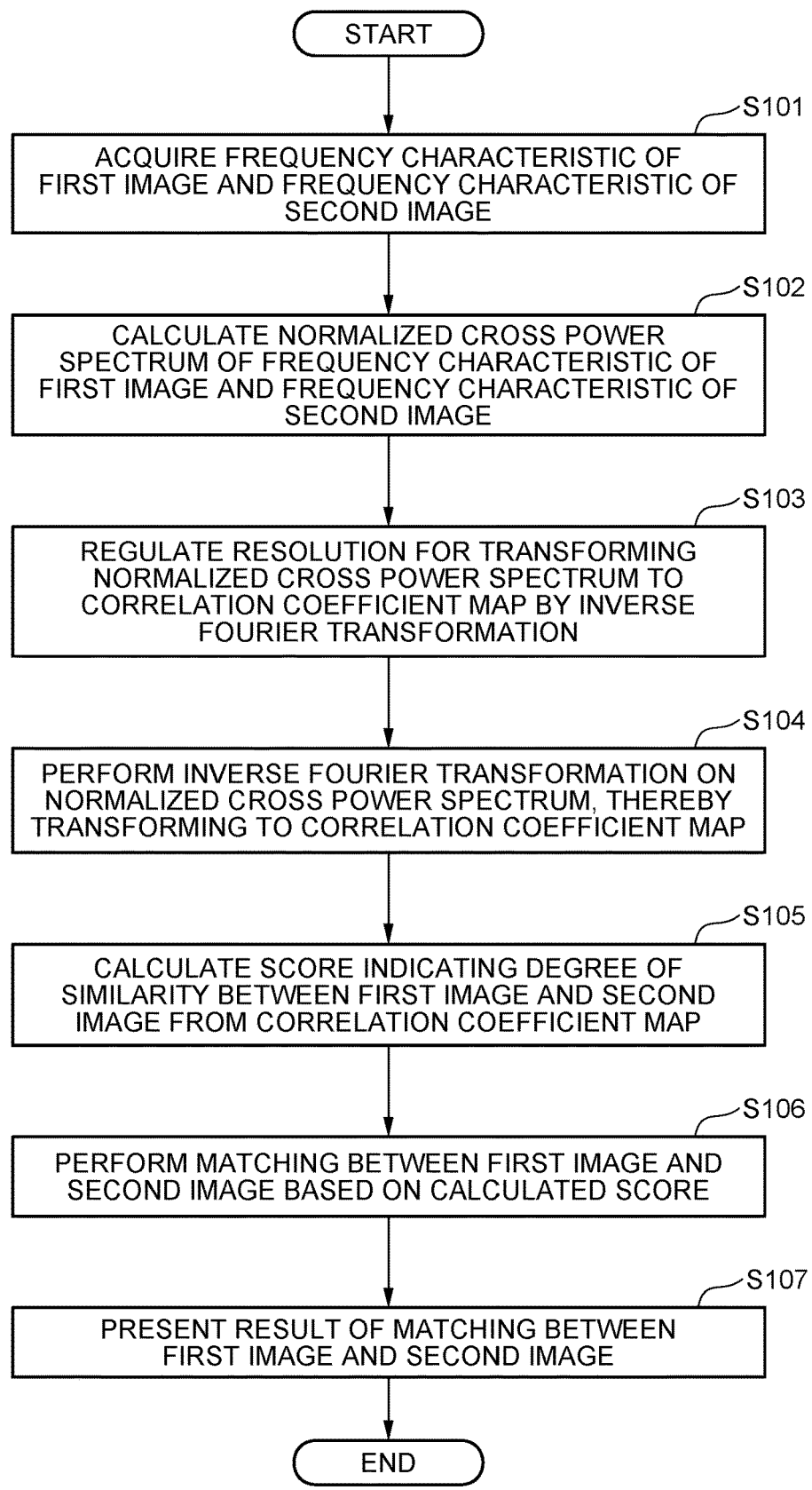
FIG. 3 is a flowchart showing the outline of operation when executing a matching process of the operation of the image matching device according to the first example embodiment of the present invention.

FIG. 3 is a flowchart showing the outline of an operation when performing a matching process of the operation of the image matching device 100 according to the first example embodiment of the present invention.

First, the frequency characteristic acquisition unit 101 acquires the frequency characteristic of the first image and the frequency characteristic of the second image (step S101). In a case where there are a plurality of second images, the frequency characteristic acquisition unit 101 acquires the frequency characteristic of each of the second images. The frequency characteristic acquisition unit 101 stores the acquired frequency characteristic of the first image into the first storage unit 102, and stores the frequency characteristic of the second image into the second storage unit 103.

Next, the frequency characteristic synthesizing unit 104 calculates a normalized cross power spectrum of the frequency characteristic of the first image stored in the first storage unit 102 and the frequency characteristic of the second image stored in the second storage unit 103 (step S102). In a case where there are a plurality of frequency characteristics of second images, the frequency characteristic synthesizing unit 104 calculates a plurality of normalized cross power spectrums of the frequency characteristic of the first image and the respective frequency characteristics of the second images.

Next, the frequency transformation resolution regulating unit 105 regulates the resolution for transforming the normalized cross power spectrum calculated by the frequency characteristic synthesizing unit 104 to a correlation coefficient map by the inverse Fourier transformation (step 103). For example, the frequency transformation resolution regulating unit 105 sets the minimum necessary resolution for matching determined through an operation shown in FIG. 4 to be described later, as the resolution after regulation.

Next, the matching determination unit 106 performs the inverse Fourier transformation on the normalized cross power spectrum by using the resolution regulated by the frequency transformation resolution regulating unit 105, thereby transforming to a correlation coefficient map (step S104). Then, the matching determination unit 106 calculates a score indicating the degree of similarity between the first image and the second image from the correlation coefficient map (step S105). In a case where there are a plurality of normalized cross power spectrums, the matching determination unit 106 performs the inverse Fourier transformation on the respective normalized cross power spectrums, thereby transforming to correlation coefficient maps. Moreover, the matching determination unit 106 calculates the score indicating the degree of similarity between the first image and the second image for each of the correlation efficient maps.

Next, the matching determination unit 106 performs matching between the first image and the second image based on the calculated score (step S106).

For example, in a case where there is one second image, if the score satisfies a predetermined reference value, the matching determination unit 106 derives a matching result that the first image matches (is identical to) the second image. On the other hand, if the score does not satisfy the predetermined reference value, the matching determination unit 16 derives a matching result that the first image does not match (is not identical to) the second image.

Further, for example, in a case where there are a plurality of second images, if the best score of the calculated scores satisfies a predetermined reference value, the matching determination unit 106 derives a matching result that the first image matches (is identical to) the second image of the best score. On the other hand, if the abovementioned best score does not satisfy the predetermined reference value, the matching determination unit 16 derives a matching result that the first image does not match (is not identical to) the second images.

Next, the information presenting unit 107 presents the matching result of matching between the first image and the second image obtained from the matching determination unit (step S107).

Figure 4:
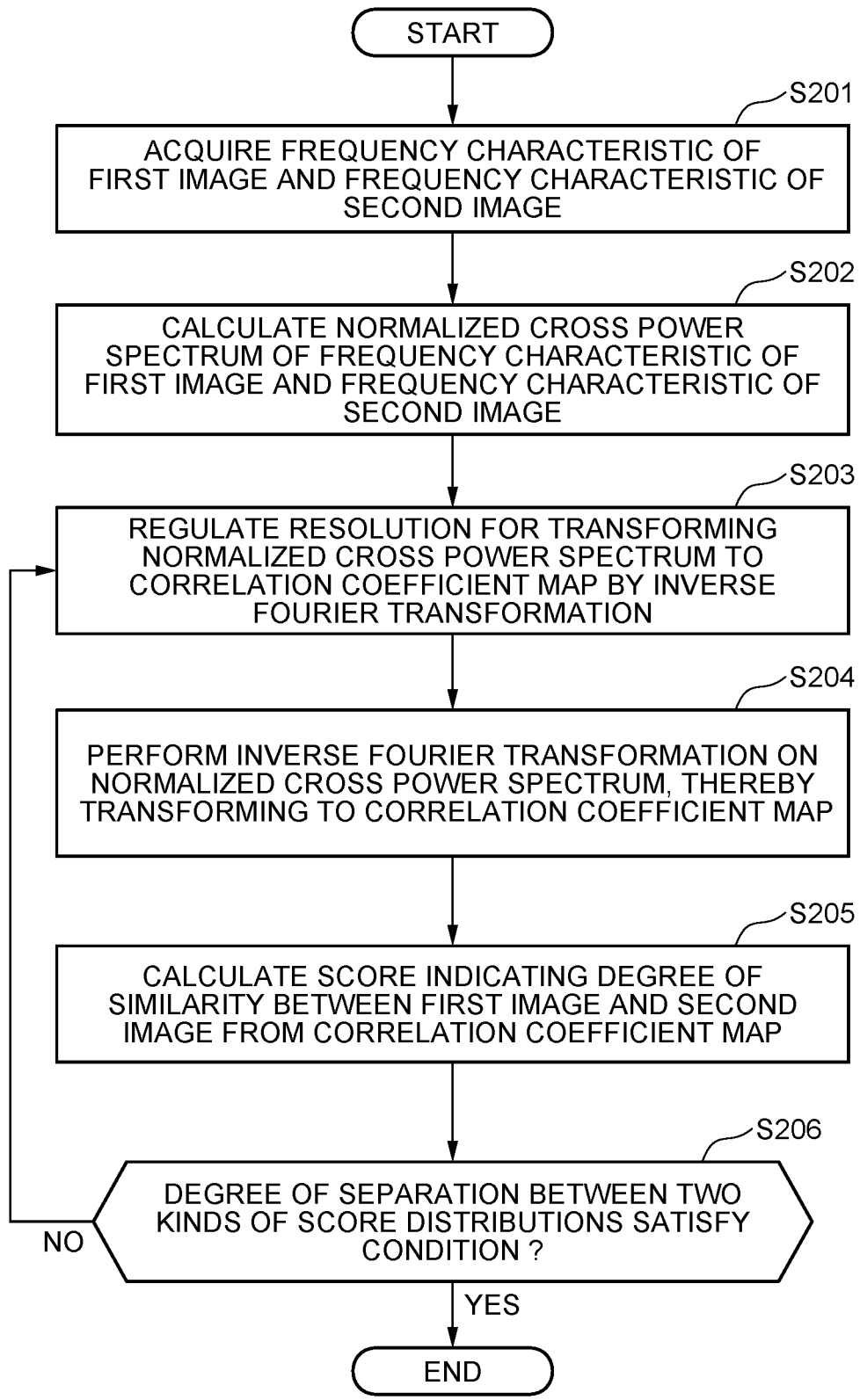
FIG. 4 is a flowchart showing the outline of operation when automatically determining the minimum necessary resolution for matching of the operation of the image matching device according to the first example embodiment of the present invention.

FIG. 4 is a flowchart showing the outline of an operation when automatically determining the minimum necessary resolution for matching, of the operation of the image matching device 100 according to the first example embodiment of the present invention. The operation shown in FIG. 4 (a target resolution determining operation) is executed before an operation of performing actual matching (a matching operation) in accordance with the flow shown in FIG. 3. It depends on, for example, an instruction input by the operation input unit 202 whether the image matching device 100 performs the operation shown in FIG. 3 or the operation shown in FIG. 4.

First, the frequency characteristic acquisition unit 101 acquires the frequency characteristic of the first image and the frequency characteristic of the second image (step S201). In a case where there are a plurality of second images, the frequency characteristic acquisition unit 101 acquires the frequency characteristic of each of the second images. The frequency characteristic acquisition unit 101 stores the acquired frequency characteristic of the first image into the first storage unit 102, and stores the frequency characteristic of the second image into the second storage unit 103.

Next, the frequency characteristic synthesizing unit 104 calculates a normalized cross power spectrum of the frequency characteristic of the first image stored in the first storage unit 102 and the frequency characteristic of the second image stored in the second storage unit 103 (step S202). In a case where there are a plurality of frequency characteristics of second images, the frequency characteristic synthesizing unit 104 calculates a plurality of normalized cross power spectrums of the frequency characteristic of the first image and the respective frequency characteristics of the second images.

Next, the frequency transformation resolution regulating unit 105 regulates the resolution for transforming the normalized cross power spectrum calculated by the frequency characteristic synthesizing unit 104 to a correlation coefficient map by the inverse Fourier transformation (step 203). For example, when executing step S203 first time after starting the process shown in FIG. 4, the frequency transformation resolution regulating unit 105 sets resolution of a previously determined initial value as resolution after regulation. When executing step S203 second time and later, the frequency transformation resolution regulating unit 105 sets resolution that is higher or lower than the resolution used last time, as resolution after regulation.

Next, the matching determination unit 106 performs the inverse Fourier transformation on the normalized cross power spectrum by using the resolution regulated by the frequency transformation resolution regulating unit 105, thereby transforming to a correlation coefficient map (step S204). Then, the matching determination unit 106 calculates a score indicating the degree of similarity between the first image and the second image from the correlation coefficient map (step S205). In a case where there are a plurality of normalized cross power spectrums, the matching determination unit 106 performs the inverse Fourier transformation on the respective normalized cross power spectrums, thereby transforming to correlation coefficient maps. Moreover, the matching determination unit 106 calculates the score indicating the degree of similarity between the first image and the second image for each of the correlation efficient maps.

Next, the frequency transformation resolution regulating unit 105 evaluates whether the degree of separation between two kinds of score distributions, which are the distribution of the scores when the first image matches the second image and the distribution of the scores when the first image does not match the second image, satisfies a condition (step S206). For example, when evaluating that the two kinds of score distributions are sufficiently separated, the frequency transformation resolution regulating unit 105 determines the resolution regulated thereby as the minimum necessary resolution for matching. When evaluating that the two kinds of score distributions are not sufficiently separated, the process returns to step S203 and is executed again.

<Details of Respective Units>

Next, the respective units of the image matching device 100 according to this example embodiment will be described in detail.

First, the frequency characteristic acquisition unit 101 will be described in detail.

Figure 5:
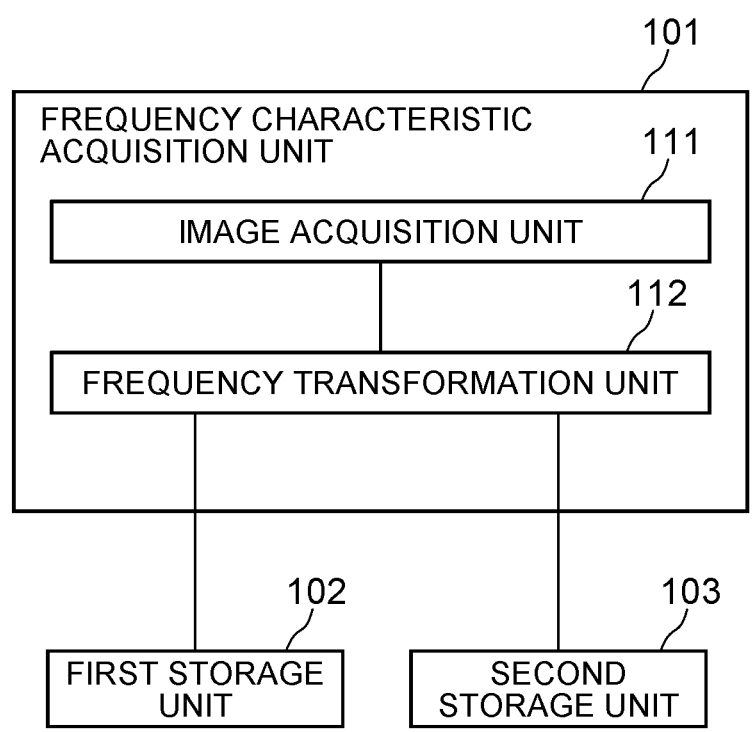
FIG. 5 is a block diagram showing an example of a frequency characteristic acquisition unit in the image matching device according to the first example embodiment of the present invention.

FIG. 5 is a block diagram showing an example of the frequency characteristic acquisition unit 101. The frequency characteristic acquisition unit 101 of this example includes an image acquisition unit 111 and a frequency transformation unit 112.

The image acquisition unit 111 is configured to acquire the first image and the second image. The image acquisition unit 111 may be capture equipment such as a camera and a scanner, for example. Alternatively, the image acquisition unit 111 may be an optical sensor that collects visible light and light having a longer wavelength than visible light, such as near-infrared rays, short-wavelength infrared rays and thermal infrared rays, with a lens and acquires the shape or the like of a target object as image data. Alternatively, the image acquisition unit 111 may be a sensor that acquires the intensity of infrared rays, ultraviolet rays or X-rays and outputs as a two-dimensional data array. Alternatively, the image acquisition unit 111 may be configured to acquire the first image and the second image from an external storage medium such as a CD-ROM or a memory. Alternatively, the image acquisition unit 111 may be configured to receive the first image and the second image via a network. Besides, the image acquisition unit 111 may use different methods for acquiring the first image and acquiring the second image.

The frequency transformation unit 112 is configured to receive the first image and the second image from the image acquisition unit 111 and output images obtained by executing the discrete Fourier transformation on the first and second images (frequency spectrum images). The frequency transformation unit 112 stores the frequency spectrum image of the first image as a first frequency characteristic into the first storage unit 102, and stores the frequency spectrum image of the second image as a second frequency characteristic into the second storage unit 103.

Next, an example of the frequency characteristics of the first and second images acquired by the frequency characteristic acquisition unit 101 will be described.

It is assumed that the first image and the second image are two images $f(n_1,n_2)$ and $g(n_1,n_2)$ of $N_1 \times N_2$ pixels. It is also assumed that discrete space indexes (integers) of two-dimensional image signals are $n_1=-M_1, \ldots, M_1$ and $n_2=-M_2, \ldots, M_2$. Herein, $M_1$ and $M_2$ are positive integers, and $N_1=2M_1+1$ and $N_2=2M_2+1$. Then, a first frequency characteristic $F(k_1,k_2)$ obtained by performing the two-dimensional discrete Fourier transformation on the image $f(n_1,n_2)$ and a second frequency characteristic $G(k_1,k_2)$ obtained by performing the two-dimensional discrete Fourier transformation on the image $g(n_1,n_2)$ are given by Equation 1 and Equation 2 shown in FIG. 6. In Expressions 1 and 2, $k_1=-M_1, \ldots, M_1$ and $k_2=-M_2, \ldots, M_2$ are discrete frequency indexes (integers). Moreover, $W_{N1}$ and $W_{N2}$ are twiddle factors, which are given by Equations 3 and 4 shown in FIG. 6. Moreover, $A_F(k_1,k_2)$ and $A_G(k_1,k_2)$ denote amplitude spectrums (amplitude components), and $\theta_F(k_1,k_2)$ and $\theta_G(k_1,k_2)$ denote phase spectrums (phase components), respectively. Moreover, $\Sigma_{n1,n2}$ denote addition over the entire index range as shown in Equation 5 of FIG. 6.

Next, the frequency characteristic synthesizing unit 104 will be described in detail.

The frequency characteristic synthesizing unit 104 calculates a normalized cross power spectrum $R(k_1,k_2)$ of the first frequency characteristic $F(k_1,k_2)$ and the second frequency characteristic $G(k_1,k_2)$ by Equation 6 shown in FIG. 7. In Equation 6, overline $G(k_1,k_2)$ is the complex conjugate of the second frequency characteristic $G(k_1,k_2)$. Moreover, $\theta_F(k_1,k_2)-\theta_G(k_1,k_2)$ is a phase difference spectrum between the first frequency characteristic and the second frequency characteristic. As shown in Equation 6, the frequency characteristic synthesizing unit 104 calculates a normalized cross power spectrum by obtaining a cross power spectrum that is the product for each element of the first frequency characteristic $F(k_1,k_2)$ and the complex conjugate of the second frequency characteristic $G(k_1,k_2)$, and normalizing the cross power spectrum with the absolute value thereof.

In a case where the image $f(n_1,n_2)$ and the image $g(n_1,n_2)$ are a pair of identical images with positional shift, the frequency characteristic $F(k_1,k_2)$ of the image $f(n_1,n_2)$, the frequency characteristic $G(k_1,k_2)$ of the image $g(n_1,n_2)$, and the normalized cross power spectrum $R(k_1,k_2)$ of the two frequency characteristics are given by Equations 7, 8, and 9 shown in FIG. 8. Herein, $\delta_1$ and $\delta_2$ denote the amount of positional shift between the image $f(n_1,n_2)$ and the image $g(n_1,n_2)$. That is, the image $g(n_1,n_2)$ is an image obtained by translating the image $f(n_1,n_2)$ by $(\delta_1,\delta_2)$. As shown in Equation 9, in a case where the two frequency characteristics $F(k_1,k_2)$ and $G(k_1,k_2)$ for matching are a pair of identical images, the normalized cross power spectrum $R(k_1,k_2)$ thereof is expressed as a complex sine wave with a single period for each dimension (for each of $k_1$ and $k_2$). On the other hand, in a case where the two frequency characteristics $F(k_1,k_2)$ and $G(k_1,k_2)$ for matching are not a pair of identical images, the normalized cross power spectrum $R(k_1,k_2)$ thereof is not a complex sine wave with a single period for each dimension.

Next, before description of the frequency transformation resolution regulating unit 105, the matching determination unit 106 will be described in detail.

First, the matching determination unit 106 performs the inverse Fourier transformation on a normalized cross power spectrum to calculate a correlation coefficient map. Then, the matching determination unit 106 determines whether to be identical individuals or different individuals based on the maximum value of peaks in the calculated correlation coefficient map. As mentioned before, in the case of a pair of identical images, a normalized cross power spectrum thereof is expressed as a complex sine wave with a single period. Therefore, when the inverse Fourier transformation is performed thereon, only a specific spectrum outstandingly appears and sharp peaks appear in the correlation coefficient map. A correlation coefficient map $r(n_1,n_2)$ is given by Equation 10 shown in FIG. 9. On the other hand, in the case of not a pair of identical images, a normalized cross power spectrum thereof is not a complex sine wave with a single period. Therefore, sharp peaks do not appear in the correlation coefficient map. In other words, whether or not to be identical images can be determined based on the maximum value of the peaks in the correlation coefficient map.

In the inverse Fourier transformation, the amount of calculation depends on the resolution of a correlation coefficient map after the transformation. In a case where the resolution is low, the image size, that is, the total number of pixels of the correlation coefficient map is small, so that the amount of calculation is small. Therefore, when speedy matching is desired, the resolution can be set low. However, in a case where the resolution is set too low, it may be impossible to determine whether or not to be a pair of identical images because the value of one pixel of the correlation coefficient map becomes the value of the average including the peripheral portions of the peaks and hence the maximum value of the peaks becomes small. In other words, it may be impossible to perform matching. Therefore, in order to perform matching as speedily as possible within a range in which the matching is possible, it is required to regulate the resolution to a proper value and then perform the inverse Fourier transformation. Hereinafter, the value of proper resolution will be referred to as optimum transformation resolution.

A method for regulating the resolution is, for example, decreasing the resolution by cutting out and using only a low-frequency band of the data before transformation, increasing the resolution by zero-filling the data before transformation, and so on. The resolution may be regulated by a combination of the abovementioned methods, for example, decreasing the resolution and thereafter increasing the resolution by zero-filling.

Figure 10:
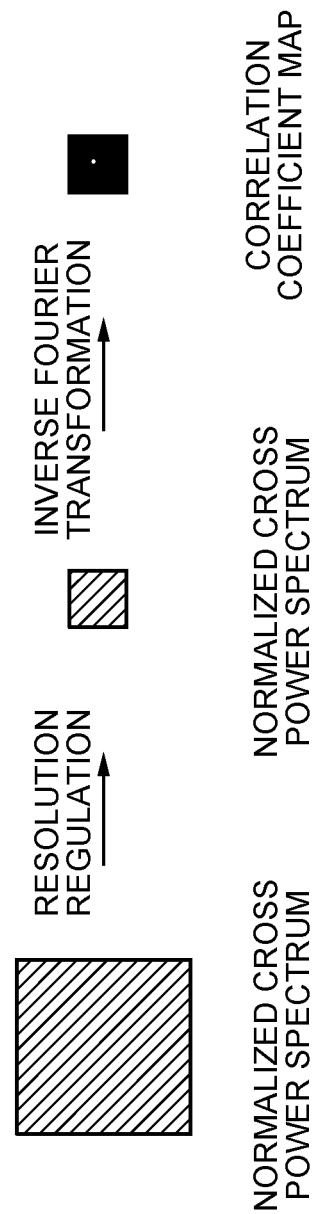
FIG. 10 is a schematic view of a case where, in the inverse Fourier transformation, the resolution is decreased by cutting out and using only a low-frequency band of data before transformation.
Figure 11:
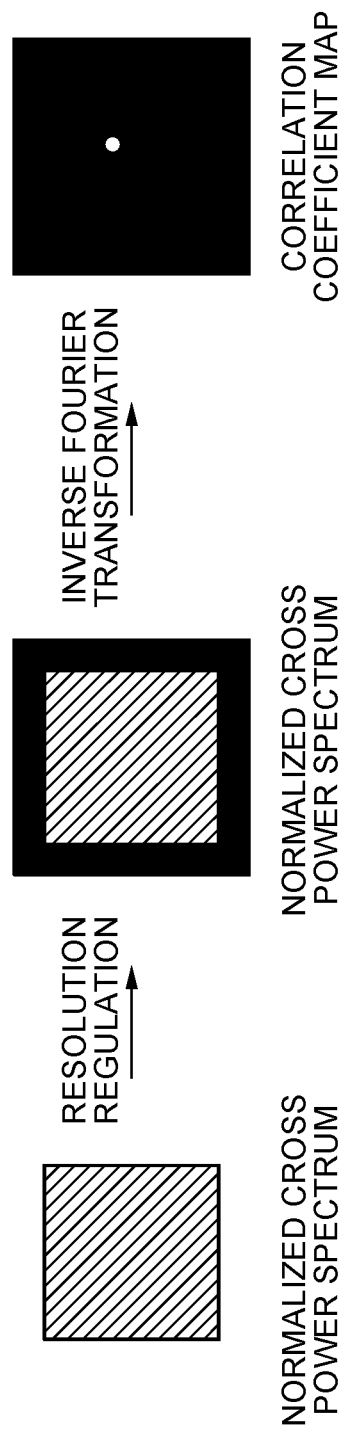
FIG. 11 is a schematic view of a case where, in the inverse Fourier transformation, the resolution is increased by zero-filling the data before transformation.

FIG. 10 is a schematic view of a case of decreasing the resolution by cutting out and using only a low-frequency band of data before transformation;

FIG. 11 a schematic view of a case of increasing the resolution by zero-filling data before transformation;

The frequency transformation resolution regulating unit 105 will be described in detail.

The frequency transformation resolution regulating unit 105 is configured to automatically determine the optimum transformation resolution. The frequency transformation resolution regulating unit 105 is also configured to give the optimum transformation resolution to the matching determination unit 106.

Figure 12:
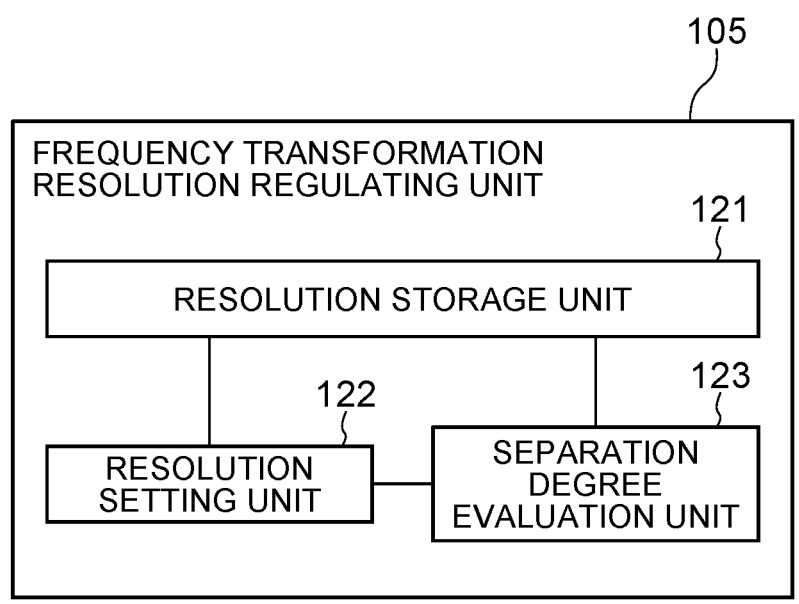
FIG. 12 is a block diagram showing an example of a frequency transformation resolution regulating unit in the image matching device according to the first example embodiment of the present invention.

FIG. 12 is a block diagram showing an example of the frequency transformation resolution regulating unit 105. The frequency transformation resolution regulating unit 105 of this example includes a resolution storage unit 121, a resolution setting unit 122, and a separation degree evaluation unit 123.

In the resolution storage unit 121, the image size (resolution) of a correlation coefficient map calculated by the matching determination unit 106 is stored.

The resolution setting unit 122 is configured to retrieve the value of the resolution stored in the resolution storage unit 121 and give the resolution to the matching determination unit 106.

The separation degree evaluation unit 123 is configured to evaluate a degree whether matching can be sufficiently performed, based on a score between identical individuals and a score between different individuals obtained from the matching determination unit 106. The separation degree evaluation unit 123 is also configured to feed back information to the resolution storage unit 121 and the resolution setting unit 122 based on the evaluation result.

The separation degree evaluation unit 123 is used only when the frequency transformation resolution regulating unit 105 automatically determines the optimum transformation resolution, and is not used in the matching process. In other words, the separation degree evaluation unit 123 is used when the process shown in FIG. 4 is executed, and is not used when the process shown in FIG. 3 is executed.

Next, the flow of a process that the frequency transformation resolution regulating unit 105 automatically determines the optimum transformation resolution will be described.

For the frequency transformation resolution regulating unit 105 to automatically determine the optimum transformation resolution, a plurality of registered images are used. Hereinafter, a plurality of registered images will be referred to as a registration DB. The registration DB may include identical individuals or may include all different individuals. The registration DB need to include at least two different individual images.

First, a method for automatically determining the optimum transformation resolution in a case where all of the registration DB are different individuals will be described.

By performing the matching process on plural pairs of registration images by using the image matching device 100, a plurality of scores can be obtained. In this matching process, for example, it is assumed that the resolution storage unit 121 first holds a sufficiently small value as the image size (resolution) of a correlation coefficient map and the accuracy of matching is decreasing. Assuming that the registration DB includes r registration images, the combination of different individuals is r(r−1)/2, so that the number of scores between different individuals that can be obtained is r(r−1)/2. Then, a distribution can be obtained from the scores between different individuals. Hereinafter, the distribution of the scores will be referred to as a score distribution.

If there is a score distribution of identical individuals, resolution that separates a score distribution of identical individuals from a score distribution of different individuals can be determined as the optimum transformation resolution. However, because identical individuals are not included in the registration DB, a score distribution of identical individuals cannot be simply obtained. Then, at least one or more s images out of the r images of the registration DB are selected as an original image and processed by image processing to generate a pseudo identical individual image. Examples of the processing method include translating the image, rotating the image, and adding noise. Moreover, a plurality of processes may be performed on one image, and a plurality of pseudo identical individual images may be generated for one original image.

An original image selected from the registration DB and a pseudo identical individual image generated from the original image are handled as identical individuals. In that case, since the number of combinations of the identical individuals is s or more, it is possible by performing the matching process between the identical individuals to obtain s or more scores of the identical individuals. Then, a score distribution can be obtained from the scores of the identical individuals.

Figure 13:
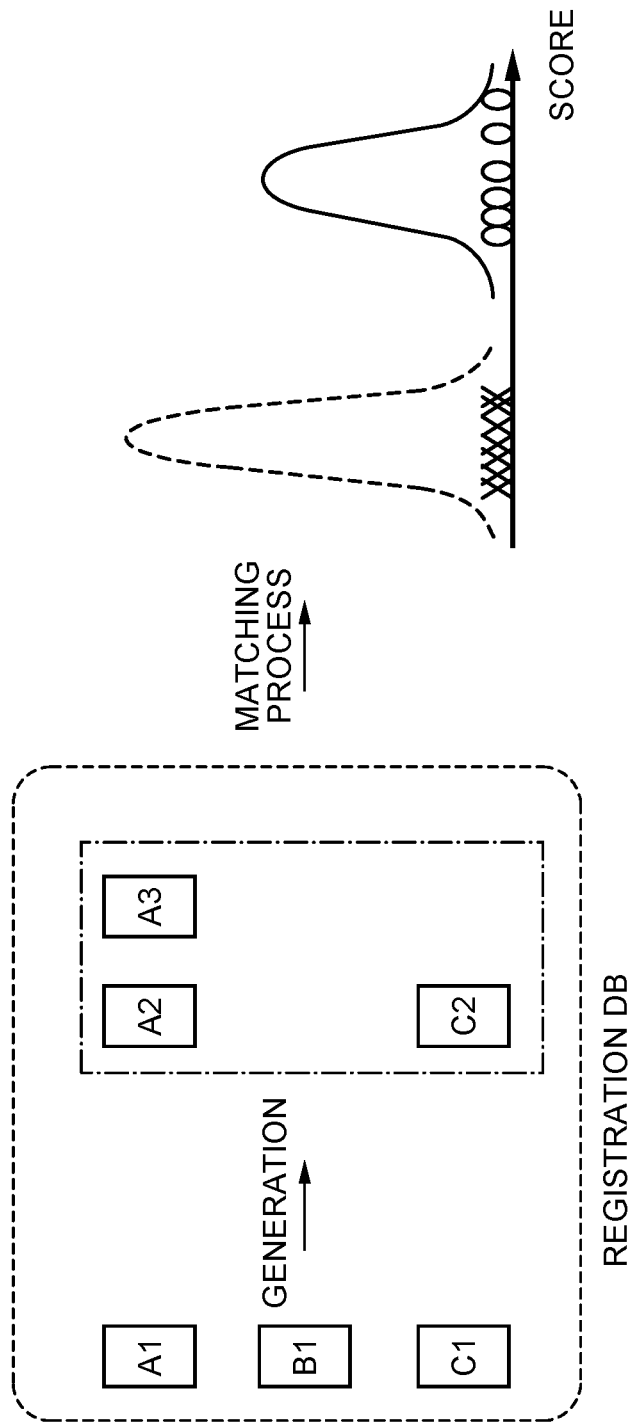
FIG. 13 is a schematic view of a method for obtaining a score distribution in a case where all in a registration DB are different individuals in a method for automatic determination of the optimum transformation resolution.

FIG. 13 is a schematic view of a method for obtaining a score distribution in a case where all of the registration DB are different individuals. A1, B1, and C1 denote images of different individuals in the registration DB. A2 and A3 denote images obtained by processing A1 and are handled as individuals which are identical to A1. C2 denotes an image obtained by processing C1 and is handled as an individual which is identical to C1. White circle marks and a solid line above the marks represent scores of identical individual pairs and a score distribution of the identical individual pairs, respectively. White cross marks and a dotted line above the marks represent scores of different individual pairs and a score distribution of the different individual pairs.

In a case where a score distribution of identical individual pairs and a score distribution of different individual pairs are obtained, resolution that separates the score distributions can be determined to be the optimum transformation resolution as mentioned before. An example of an indicator whether or not score distributions are separated is using a normal distribution. To be specific, assuming that a score distribution of different individual pairs is a normal distribution, when the average value is $\mu$ and the standard deviation is $\sigma$, whether or not all the scores of identical individual pairs are larger than $\mu+3\sigma$ is used as an index, for example.

In a case where all the scores of identical individual pairs are larger than $\mu+3\sigma$, the separation degree evaluation unit 123 evaluates that the score distributions are separated and determines the resolution given by the resolution setting unit 122 to the matching determination unit 106, as the optimum transformation resolution. Then, the separation degree evaluation unit 123 gives the value of the optimum transformation resolution to the resolution storage unit 121.

In a case where part of the scores of identical individual pairs is smaller than $\mu+3\sigma$, the separation degree evaluation unit 123 evaluates that the score distributions are not sufficiently separated. Then, the separation degree evaluation unit 123 gives the value of different resolution that is larger than the current one to the resolution storage unit 121. After that, the matching process between identical individuals and the matching process between different individuals are executed again, and evaluation of the separation degree is performed in the same manner. This process is repeatedly executed until the separation degree evaluation unit 123 evaluates that score distributions are separated.

Next, a method for automatically determining the optimum transformation resolution in a case where identical individuals are included in the registration DB will be described.

As mentioned before, as with a case where all in the registration DB are different individuals, by performing the matching process on plural pairs of registration images by using the image matching device 100, a plurality of scores can be obtained. The obtained scores include two kinds of scores, that is, a score of a pair of identical individuals and a score of a pair of different individuals. Therefore, it is possible to obtain both a score distribution of identical individual pairs and a score distribution of different individual pairs.

Figure 14:
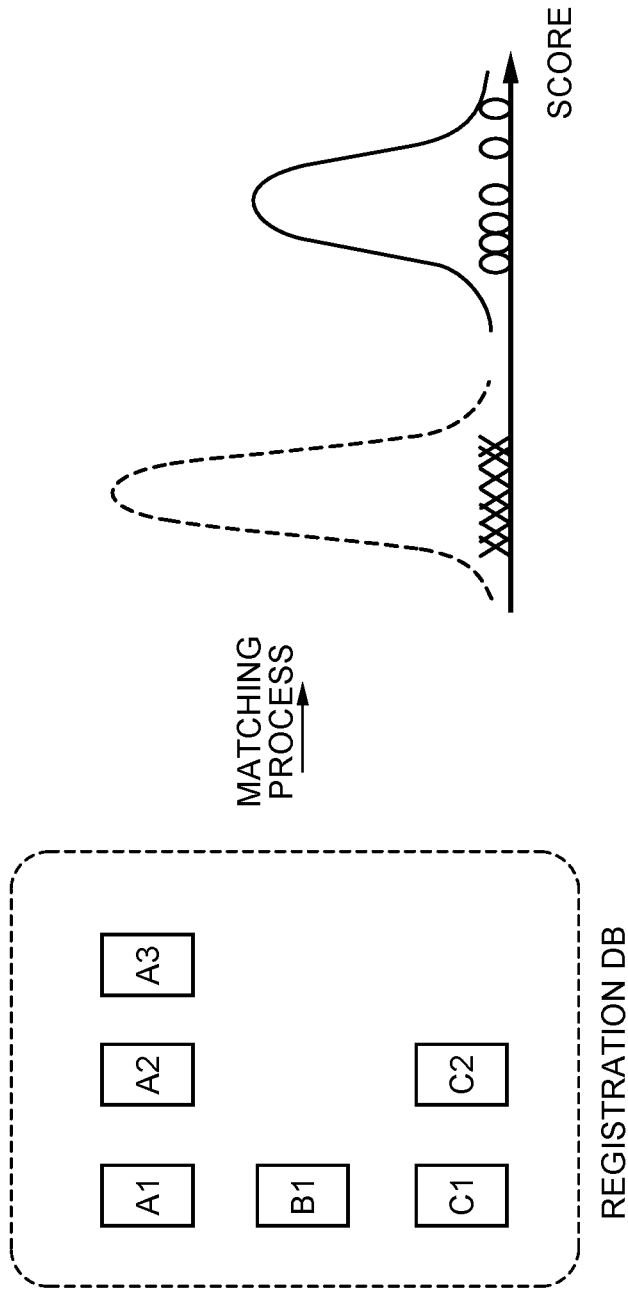
FIG. 14 is a schematic view of a method for obtaining a score distribution in a case where identical individuals are included in the registration DB in the method for automatic determination of the optimum transformation resolution.

FIG. 14 is a schematic view of a method for obtaining a score distribution in a case where identical individuals are not included in the registration DB. A1, B1, and C1 denote images of different individuals in the registration DB. A2 and A3 denote images obtained by capturing an individual identical to that of A1 and are handled as individuals which are identical to A1. C2 denotes an image obtained by capturing an individual identical to that of C1 and is handled as an individual which is identical to C1. White circle marks and a solid line above the marks represent scores of identical individual pairs and a score distribution of the identical individual pairs, respectively. White cross marks and a dotted line above the marks represent scores of different individual pairs and a score distribution of the different individual pairs.

Because a score distribution of identical individual pairs and a score distribution of different individual pairs are obtained, the separation degree evaluation unit 123 can automatically determine the optimum transformation resolution as described in the case where identical individuals are not included in the registration DB. For example, in a case where the number of identical individuals included in the registration DB is small, the score distribution of identical individual pairs is unstable. Therefore, as mentioned before, the number of identical individuals may be increased by generating a pseudo identical individual image.

In the abovementioned example, the resolution storage unit 121 first holds a sufficiently small value, but may hold a sufficiently large value. In that case, the value of resolution given by the separation degree evaluation unit 123 to the resolution storage unit 121 is the value of different resolution that is smaller than the current one. Then, the separation degree evaluation unit 123 operates so as to determine the limit resolution at which the score distributions are not sufficiently separated. For example, the separation degree evaluation unit 123 may gradually reduce the value of the resolution and, when the score distributions are not sufficiently separated at a certain value first time, determine a value immediately before the value as the optimum transformation resolution.

Further, the value of resolution given by the separation degree evaluation unit 123 to the resolution storage unit 121 does not necessarily need to be a larger value or a smaller value than the current one at all times during repetition of the process until the optimum transformation resolution is determined. For example, the value of resolution given by the separation degree evaluation unit 123 to the resolution storage unit 121 may be set using an optimization algorithm such as a binary search.

Further, by defining a plurality of predetermined resolutions in advance, and performing the matching process and evaluation of the separation degree for each of the resolutions, the resolution with the best evaluation result of the separation degree may be set as the optimum transformation resolution. Alternatively, among a plurality of resolutions in which all the scores of identical individual pairs become larger than $\mu+3\sigma$, the resolution with the smallest value may be set as the optimum transformation resolution.

Thus, the image matching device 100 according to this example embodiment can automatically determine the minimum necessary resolution for matching. This is because the image matching device 100 is configured to, while changing the resolution, calculate a matching score between identical individuals and a matching score between different individuals, and automatically search for the minimum necessary resolution for matching based on the scores.

Then, the image matching device 100 according to this example embodiment can speedily determine matching between the first image and the second image while securing the accuracy of matching. This is because the image matching device 100 according to this example embodiment performs frequency transformation on the first image and the second image to acquire the frequency characteristic of the first image and the frequency characteristic of the second image, synthesizes the two frequency characteristics to calculate a normalized cross power spectrum, performs frequency transformation using the determined minimum necessary resolution for matching to calculate a correlation coefficient map, and performs matching between the first image and the second image based on the correlation coefficient map. In other words, because the image matching device 100 calculates a correlation coefficient map with the minimum necessary resolution for matching, the image matching device 100 can reduce the amount of calculation of the inverse Fourier transformation while securing the accuracy of matching. Moreover, even when the image matching device 100 largely reduces the frequency extracted from the cross power spectrum, the image matching device 100 can secure the accuracy of detection of the maximum value from the correlation coefficient map and secure the accuracy of matching.

Second Example Embodiment

Next, an image matching device according to a second example embodiment of the present invention will be described. An image matching device 300 according to the second example embodiment of the present invention is different in the frequency characteristic acquisition unit 101 from the image matching device according to the first example embodiment, and is otherwise the same as the image matching device according to the first example embodiment.

Figure 15:
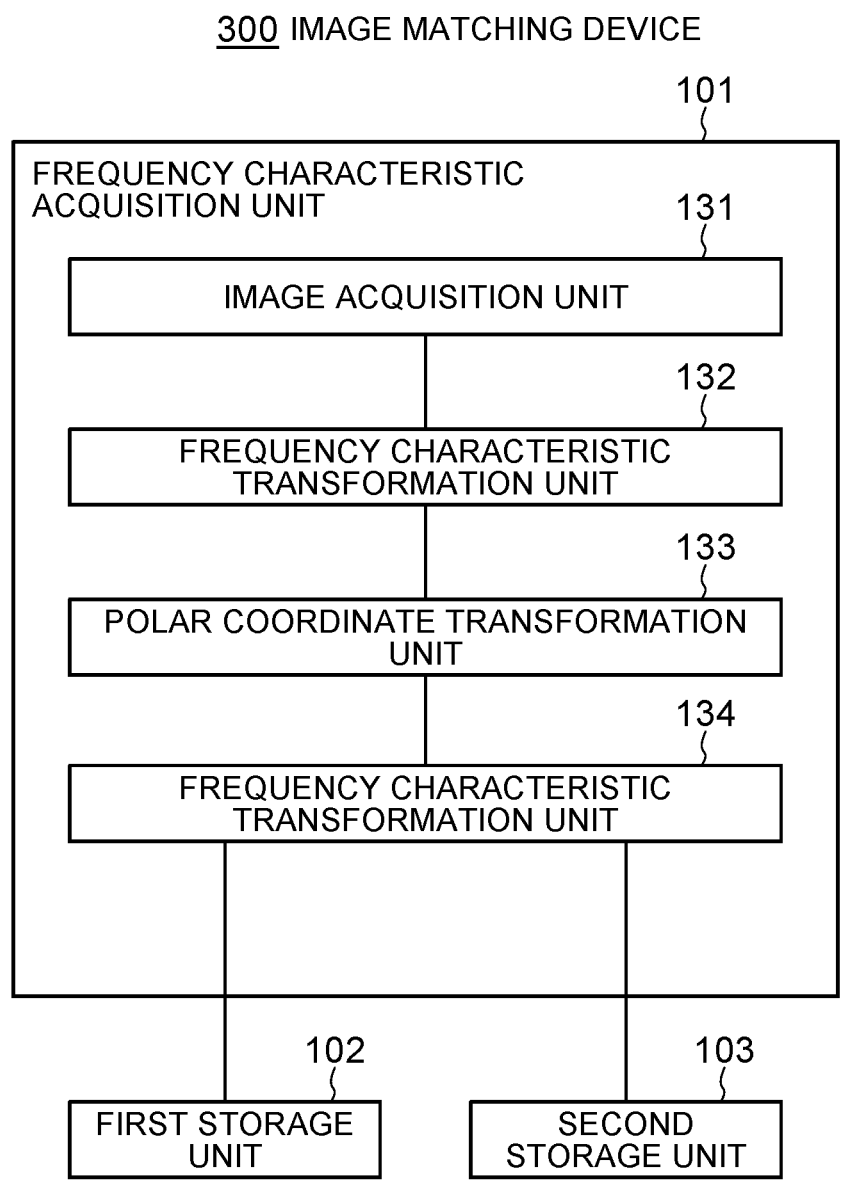
FIG. 15 is a block diagram showing an example of a frequency characteristic acquisition unit in an image matching device according to a second example embodiment of the present invention.

FIG. 15 is a block diagram of the frequency characteristic acquisition unit 101 in the image matching device 300 according to this example embodiment. The frequency characteristic acquisition unit 101 of this example includes an image acquisition unit 131, a frequency transformation unit 132, a polar coordinate transformation unit 133, and a frequency transformation unit 134.

The image acquisition unit 131 is configured to acquire the first image and the second image as with the image acquisition unit 111 shown in FIG. 5.

The frequency transformation unit 132 is configured to receive the first image and the second image from the image acquisition unit 131, execute the discrete Fourier transformation on each of the images, and calculate a two-dimensional amplitude spectrum from each result. This two-dimensional amplitude spectrum is invariant to translation of the original image.

The polar coordinate transformation unit 133 is configured to receive the two-dimensional amplitude spectrum of the first image and the two-dimensional amplitude spectrum of the second image from the frequency transformation unit 132, and execute the polar coordinate transformation or log-polar coordinate transformation on the two-dimensional amplitude spectrums to calculate a polar coordinate image. This polar coordinate image is referred to as a Fourier-Mellin characteristic image. A change of magnification and rotation of the original image is transformed into a change of translation in the Fourier-Mellin characteristic image.

The frequency transformation unit 134 is configured to receive the Fourier-Mellin characteristic image of the first image and the Fourier-Mellin characteristic image of the second image from the polar coordinate transformation unit 133, and execute the discrete Fourier transformation on the images to calculate a phase image. This phase image is referred to as a Fourier-Mellin frequency spectrum image.

The Fourier-Mellin frequency spectrum image is invariant to the magnification, rotation, and translation of the original image. The frequency transformation unit 134 stores the Fourier-Mellin frequency spectrum image of the first image into the first storage unit 102, and stores the Fourier-Mellin frequency spectrum image of the second image into the second storage unit 103.

For the same reason as with the image matching device according to the first example embodiment, the image matching device 300 according to this example embodiment can automatically determine the minimum necessary resolution for matching, and also can perform speedy matching while securing the performance of matching between the first image and the second image. Moreover, it is possible to perform robust matching to the magnification, rotation, and translation of the first and second images.

The polar coordinate transformation unit 133 shown in FIG. 15 may be omitted in an environment in which there is no positional shift in magnification and rotation between the first image and the second image. In the image matching device in which the polar coordinate transformation unit 133 is omitted, the frequency transformation unit 134 is configured to receive a two-dimensional amplitude spectrum of the first image and a two-dimensional amplitude spectrum of the second image from the frequency transformation unit 132, and store phase images obtained by performing the discrete Fourier transformation on the two-dimensional amplitude spectrums into the first storage unit 102 and the second storage unit 103.

Third Example Embodiment

Next, an image matching device according to a third example embodiment of the present invention will be described. An image matching device according to this example embodiment is different in the frequency characteristic acquisition unit 101 from the image matching devices according to the first to second example embodiments, and is otherwise the same as the image matching devices according to the first to second example embodiments.

Figure 16:
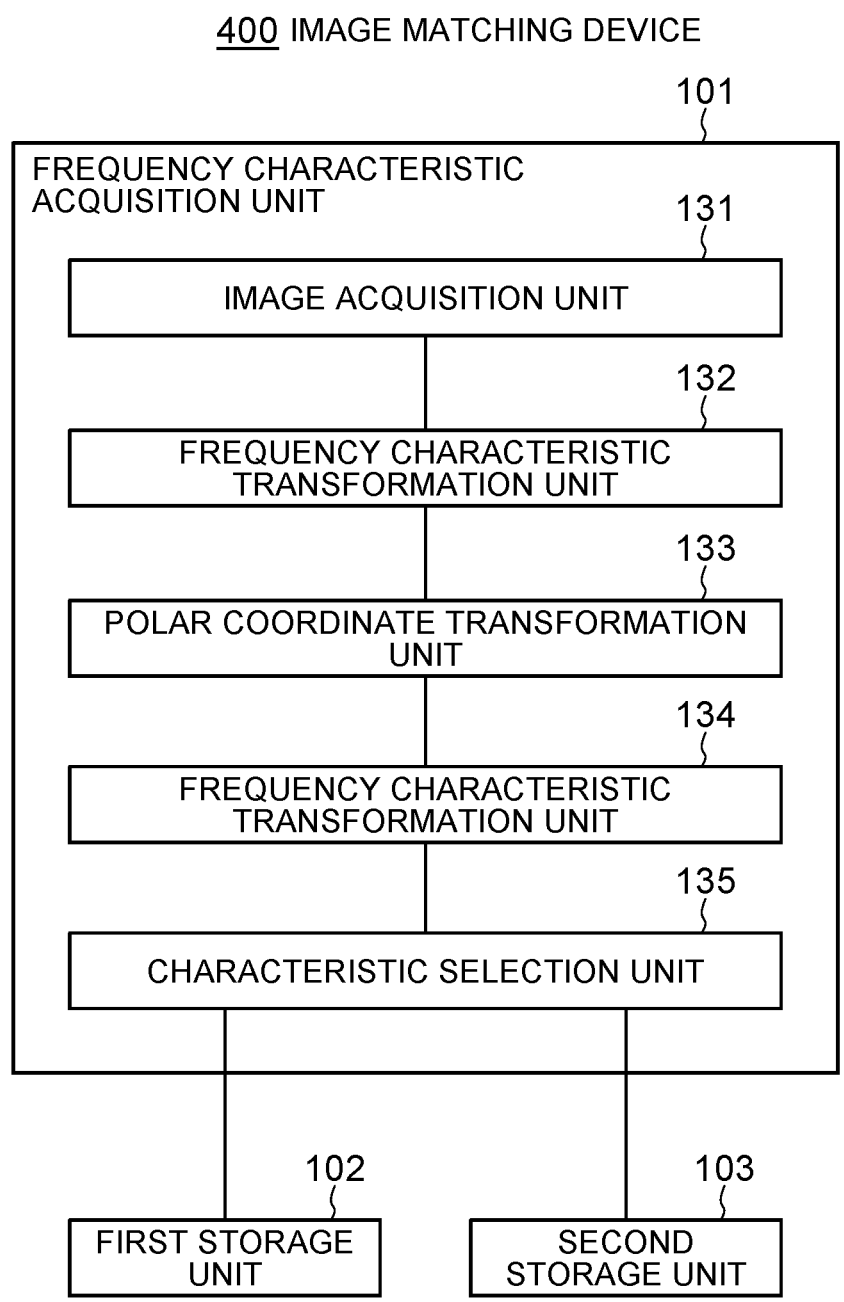
FIG. 16 is a block diagram showing an example of a frequency characteristic acquisition unit in an image matching device according to a third example embodiment of the present invention.

FIG. 16 is a block diagram of the frequency characteristic acquisition unit 101 in the image matching device 400 according to this example embodiment. The frequency characteristic acquisition unit 101 of this example has a configuration in which a characteristic selection unit 135 is added to the frequency characteristic acquisition unit 101 shown in FIG. 15.

The image acquisition unit 131 is configured to acquire the first image and the second image as with the image acquisition unit 131 of FIG. 15.

The frequency transformation unit 132 is configured to calculate a two-dimensional amplitude spectrum as with the image acquisition unit 131 of FIG. 15.

The polar coordinate transformation unit 133 is configured to calculate a Fourier-Mellin characteristic image as with the image acquisition unit 131 of FIG. 15.

The frequency transformation unit 134 is configured to receive the Fourier-Mellin characteristic image of the first image and the Fourier-Mellin characteristic image of the second image from the polar coordinate transformation unit 133 and apply the discrete Fourier transformation to the Fourier-Mellin characteristic images to calculate phase images (Fourier-Mellin frequency spectrum images).

The characteristic selection unit 135 is configured to receive the Fourier-Mellin frequency spectrum image of the first image and the Fourier-Mellin frequency spectrum image of the second image from the frequency transformation unit 134 and extract a partial region from each of the Fourier-Mellin frequency spectrum images. The extracted partial region is called a band selection Fourier-Mellin frequency spectrum image. The band selection Fourier-Mellin frequency spectrum image of the first image is stored into the first storage unit 102, and the band selection Fourier-Mellin frequency spectrum image of the second image is stored into the second storage unit 103.

The partial region extracted by the characteristic selection unit 135 is a partial region in which the maximum correlation value differs between different individuals. That is to say, the extracted partial region is a partial region with high effectiveness for individual identification. This partial region can be obtained in preprocessing using a plurality of different images. To be specific, by using the image matching device 400, the matching process is repeatedly executed on the registration DB, and it is calculated to what degree the partial region contributes to the presence/absence of a correlation peak between identical individuals. Then, the effectiveness of the partial region can be determined in accordance with the degree of contribution.

Because the partial regions extracted by the characteristic selection unit 135 are determined so that correlation peaks differ between different individuals as mentioned above, it is possible to robustly perform the matching even when the first image and the second image include a common image component. For example, in a case where the first image and the second image are different individuals and a common image component is included in the first image and the second image, the common image component generally contributes to a correlation value, so that a correlation peak appears in spite of different individuals. Meanwhile, because the characteristic selection unit 135 can exclude a partial region including such a common image component by not selecting it, a correlation peak does not appear in the case of different individuals.

For the same reason as with the image matching devices of the first and second example embodiments, the image matching device 400 according to this example embodiment can automatically determine the minimum necessary resolution for matching, and also speedily perform matching between the first image and the second image while securing the performance thereof. Moreover, the image matching device 400 can perform matching robustly against the magnification, rotation, and translation of the first and second images. Moreover, in a case where the first image and the second image include a common image component, the image matching device 400 can also robustly perform matching.

Fourth Example Embodiment

Figure 18:
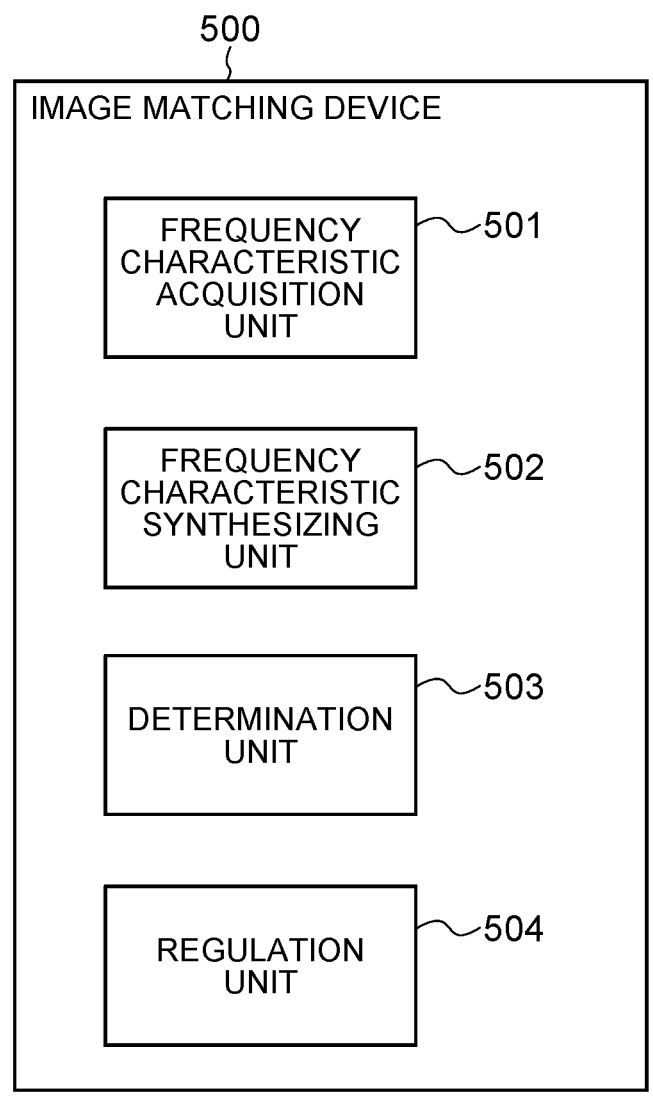
FIG. 18 is a block diagram showing an example of a frequency characteristic acquisition unit in an image matching device according to a fourth example embodiment of the present invention.

Next, an image matching device according to a fourth example embodiment of the present invention will be described. FIG. 18 is a block diagram of an image matching device 500 according to this example embodiment.

Referring to FIG. 18, the image matching device 500 includes a frequency characteristic acquisition unit 501, a frequency characteristic synthesizing unit 502, a determination unit 503, and a regulation unit 504.

The frequency characteristic acquisition unit 501 is configured to acquire the frequency characteristic of the first image and the frequency characteristic of the second image. The frequency characteristic acquisition unit 502 can be configured similarly to, for example, the frequency characteristic acquisition unit 101 of FIG. 1, but is not limited thereto.

The frequency characteristic synthesizing unit 502 is configured to synthesize the frequency characteristic of the first image and the frequency characteristic of the second image to acquire a synthesized frequency characteristic. The frequency characteristic synthesizing unit 502 can be configured similarly to the frequency characteristic synthesizing unit 104 of FIG. 1, but is not limited thereto.

The determination unit 503 is configured to perform frequency transformation on the synthesized frequency characteristic to calculate a correlation coefficient map whose resolution coincides with the target resolution, and perform matching between the first image and the second image based on a matching score calculated from the correlation coefficient map. The determination unit 503 can be configured similarly to the matching determination unit 106 of FIG. 1, but is not limited thereto.

The regulation unit 504 is configured to change the target resolution based on the matching score calculated by the determination unit 503.

The image matching device 500 thus configured according to this example embodiment operates in the following manner. That is, first, the frequency characteristic acquisition unit 501 acquires the frequency characteristic of the first image and the frequency characteristic of the second image. Next, the frequency characteristic synthesizing unit 502 synthesizes the frequency characteristic of the first image and the frequency characteristic of the second image to acquire a synthesized frequency characteristic. Next, the determination unit 503 performs frequency transformation on the synthesized frequency characteristic, calculate a correlation coefficient map whose resolution coincides with the target resolution, and performs matching between the first image and the second image based on a matching score calculated from the correlation coefficient map. Then, the regulation unit 504 changes the target resolution based on the matching score calculated by the determination unit 503.

Thus, the image matching device 500 according to this example embodiment can appropriately regulate the resolution of the correlation coefficient map. This is because the regulation unit 504 changes the target regulation based on the matching score calculated by the determination unit 503.

Although the present invention has been described above with reference to the example embodiments, the present invention is not limited to the above example embodiments. The configurations and details of the present invention can be changed in various manners that can be understood by those skilled in the art within the scope of the present invention.

For example, in the example mentioned before, the separation degree evaluation unit 123 mechanically determines whether or not two kinds of score distributions, which are the distribution of scores when the first image matches the second image and the distribution of scores when the first image does not match the second image are separated, based on whether or not the two kinds of distributions satisfy a predetermined condition. Meanwhile, the determination may be manually made. In this case, the separation degree evaluation unit 123 is configured to display a distribution view in which two kinds of distributions are drawn on the screen display unit 203, and determine whether or not the two kinds of distributions are separated in accordance with an operation input that is input through the operation input unit 202. For example, the separation degree evaluation unit 123 determines that the two kinds of distributions are separated when the operation input indicates separated, and determines that the two kinds of distributions are not separated when the operation input indicates not separated.

Further, a normalized cross power spectrum may be calculated by the following method. First, the frequency characteristic acquisition unit 101 performs frequency transformation such as the Fourier transformation on the first image and the second image, and thereafter, performs normalization by using the amplitude components thereof to calculate a normalized first frequency characteristic $F(k_1,k_2)$ and a normalized second frequency characteristic $G(k_1,k_2)$. The frequency characteristic synthesizing unit 104 synthesizes the normalized frequency characteristics to calculate a normalized cross power spectrum. To be specific, the frequency characteristic synthesizing unit 104 calculates a normalized cross power spectrum by obtaining a cross power spectrum that is the product for each element of the first frequency characteristic $F(k_1,k_2)$ and the complex conjugate of the second frequency characteristic $G(k_1,k_2)$. In this case, unlike the method shown in Equation 6 of FIG. 7, the frequency characteristic synthesizing unit 104 does not execute the process of normalizing with the absolute value. With the method of calculating the normalized cross power spectrum in the above manner, when there are a plurality of second images, it is possible, by previously storing normalized frequency characteristics of the respective images in the second storage unit, to speedily perform the matching process. This is because at the time of matching, it is possible to calculate a normalized cross power spectrum merely by synthesizing the normalized frequency characteristic of the first image and the normalized frequency characteristic of the second image, and it is possible to omit the process of normalizing with the absolute value.

Although the present invention has been described above with reference to the example embodiments, the present invention is not limited to the above example embodiments. The configurations and details of the present invention can be changed in various manners that can be understood by those skilled in the art within the scope of the present invention.

INDUSTRIAL APPLICABILITY

The present invention can be used in the field of performing matching between two images, more particularly, can be used in the field of performing individual identification and management of products by acquiring a difference of naturally generated fine patterns that are generated in the same manufacturing process, such as fine irregularities or patterns on the product surface and random patterns on the material surface, as an image by using a capture device such as a camera, and recognizing the fine patterns.

The whole or part of the example embodiments disclosed above can be described as, but not limited to, the following supplementary notes.
[Supplementary Note 1]
An image matching device that performs matching between a first image and a second image, the image matching device comprising:
a frequency characteristic acquisition unit configured to acquire a frequency characteristic of the first image and a frequency characteristic of the second image;
a frequency characteristic synthesizing unit configured to synthesize the frequency characteristic of the first image and the frequency characteristic of the second image to generate a synthesized frequency characteristic;

a determination unit configured to perform frequency transformation on the synthesized frequency characteristic to calculate a correlation coefficient map whose resolution coincides with a target resolution, and perform matching between the first image and the second image based on a matching score calculated from the correlation coefficient map; and a regulation unit configured to regulate the target resolution based on the matching score.

[Supplementary Note 2]

The image matching device according to Supplementary Note 1, wherein the regulation unit is configured to search for the target resolution with smaller value that separates a distribution of the matching score when the first image and the second image are identical from a distribution of the matching score when the first image and the second image are not identical.

[Supplementary Note 3]

The image matching device according to Supplementary Note 1 or 2, wherein the regulation unit is configured to selectively perform a target resolution determining operation and a matching operation, the regulation unit being configured to, in the target resolution determining operation;

while varying target resolutions, repeat an operation of, under one of the target resolutions, calculating a first distribution that is the distribution of the matching score when the first image and the second are identical, by the acquiring by the frequency characteristic acquisition unit, the synthesizing by the frequency characteristic synthesizing unit and the calculating the matching score by the determination unit, in order to perform matching between the first image and the second image that is identical to the first image, and calculating a second distribution that is the distribution of the matching score when the first image and the second are not identical, by the acquiring by the frequency characteristic acquisition unit, the synthesizing by the frequency characteristic synthesizing unit and the calculating the matching score by the determination unit, in order to perform matching between the first image and the second image that is not identical to the first image, and search for the target resolution with smaller value that separates the first distribution from the second distribution in the target resolutions, the regulation unit being configured to, in the matching operation, set the searched target resolution to the determination unit.

[Supplementary Note 4]

The image matching device according to Supplementary Note 2 or 3, wherein the regulation unit is configured to determine whether or not the first distribution is separated from the second distribution based on whether or not the first distribution and the second distribution satisfy a predetermined condition.

[Supplementary Note 5]

The image matching device according to Supplementary Note 2 or 3, wherein the regulation unit is configured to display the first distribution and the second distribution on a display device, and determine whether or not the first distribution is separated from the second distribution in accordance with a user input that is input from an input device.

[Supplementary Note 6]

The image matching device according to any of Supplementary Notes 1 to 5, wherein the determination unit is configured to, in a case where the matching score satisfies a predetermined reference value, generate a matching result indicating that the first image matches the second image.

[Supplementary Note 7]

The image matching device according to any of Supplementary Notes 1 to 6, further comprising an output unit configured to output a result of the matching by the determination unit.

[Supplementary Note 8]

An image matching method for performing matching between a first image and a second image, the image matching method comprising:

acquiring a frequency characteristic of the first image and a frequency characteristic of the second image;

synthesizing the frequency characteristic of the first image and the frequency characteristic of the second image to generate a synthesized frequency characteristic;

performing frequency transformation on the synthesized frequency characteristic to calculate a correlation coefficient map whose resolution coincides with a target resolution;

performing matching between the first image and the second image based on a matching score calculated from the correlation coefficient map; and regulating the target resolution based on the matching score.

[Supplementary Note 9]

The image matching method according to Supplementary Note 8, wherein in the regulating, the target resolution with smaller value is searched for, the target resolution separating a distribution of the matching score when the first image and the second image are identical from a distribution of the matching score when the first image and the second image are not identical.

[Supplementary Note 10]

The image matching method according to Supplementary Note 8 or 9, wherein:

the regulating includes a target resolution determining operation and a matching operation;

in the target resolution determining operation, an operation is repeated while target resolutions are varied, the operation being, under one of the target resolutions, calculating a first distribution that is the distribution of the matching score when the first image and the second are identical, by the acquiring, the synthesizing and the calculating the matching score, in order to perform matching between the first image and the second image that is identical to the first image, and calculating a second distribution that is the distribution of the matching score when the first image and the second are not identical, by the acquiring, the synthesizing and the calculating the matching score, in order to perform matching between the first image and the second image that is not identical to the first image, and the target resolution with smaller value that separates the first distribution from the second distribution is searched for in the target resolutions; and in the matching operation, the searched target resolution is set to the determination unit.

[Supplementary Note 11]

The image matching method according to Supplementary Note 9 or 10, wherein in the regulating, whether or not the first distribution is separated from the second distribution is determined based on whether or not the first distribution and the second distribution satisfy a predetermined condition.

[Supplementary Note 12]

The image matching method according to Supplementary Note 9 or 10, wherein in the regulating, the first distribution and the second distribution are displayed on a display device, and it is determined whether or not the first distribution is separated from the second distribution in accordance with a user input that is input from an input device.
[Supplementary Note 13]
The image matching method according to any of Supplementary Notes 8 to 12, wherein in the matching, in a case where the matching score satisfies a predetermined reference value, a matching result indicating that the first image matches the second image is generated.
[Supplementary Note 14]
The image matching method according to any of Supplementary Notes 8 to 13, wherein in the matching, a result of the matching is output.
[Supplementary Note 15]
A computer program comprising instructions for causing a computer that performs matching between a first image and a second image to functions as:
a frequency characteristic acquisition unit configured to acquire a frequency characteristic of the first image and a frequency characteristic of the second image;
a frequency characteristic synthesizing unit configured to synthesize the frequency characteristic of the first image and the frequency characteristic of the second image to generate a synthesized frequency characteristic;
a determination unit configured to perform frequency transformation on the synthesized frequency characteristic to calculate a correlation coefficient map whose resolution coincides with a target resolution, and perform matching between the first image and the second image based on a matching score calculated from the correlation coefficient map; and
a regulation unit configured to regulate the target resolution based on the matching score.

DESCRIPTION OF REFERENCE NUMERALS

100 image matching device
101 frequency characteristic acquisition unit
102 first storage unit
103 second storage unit
104 frequency characteristic synthesizing unit
105 frequency transformation resolution regulating unit
106 matching determination unit
107 information presenting unit
111 image acquisition unit
112 frequency transformation unit
121 resolution storage unit
122 resolution setting unit
123 separation degree evaluation unit
131 image acquisition unit
132 frequency transformation unit
133 polar coordinate transformation unit
134 frequency transformation unit
135 characteristic selection unit
200 information processing device
201 capture unit
202 operation input unit
203 screen display unit
204 communication interface unit
205 storage unit
206 arithmetic logic unit
207 program
300 image matching device
400 image matching device
500 image matching device
501 frequency characteristic acquisition unit
502 frequency characteristic synthesizing unit
503 determination unit
504 regulation unit

The invention claimed is:
1. An image matching device that performs matching between a first image and a second image, the image matching device comprising:
a computer readable memory having program instructions stored therein; and
a processor configured to execute the program instructions stored in the memory, that when executed implement a device comprising:
a frequency characteristic acquisition unit configured to acquire a frequency characteristic of the first image and a frequency characteristic of the second image;
a frequency characteristic synthesizing unit configured to synthesize the frequency characteristic of the first image and the frequency characteristic of the second image to generate a synthesized frequency characteristic;
a determination unit configured to perform frequency transformation on the synthesized frequency characteristic to calculate a correlation coefficient map whose resolution coincides with a target resolution among a plurality of resolutions, and perform matching between the first image and the second image based on a matching score calculated from the correlation coefficient map; and
a regulation unit configured to regulate the target resolution based on the matching score,
wherein the regulation unit is configured to search for another target resolution, with a smaller value than the target resolution, that separates a first distribution from a second distribution, the first distribution being a distribution of the matching score when the first image and the second image are identical, the second distribution being a distribution of the matching score when the first image and the second image are not identical.
2. The image matching device according to claim 1 wherein the regulation unit is configured to, in the searching for the other target resolution;
while varying target resolutions, repeat an operation of, under one of the target resolutions, calculating the first distribution by the acquiring by the frequency characteristic acquisition unit, the synthesizing by the frequency characteristic synthesizing unit and the calculating the matching score by the determination unit, in order to perform matching between the first image and the second image that is identical to the first image, and calculating the second distribution by the acquiring by the frequency characteristic acquisition unit, the synthesizing by the frequency characteristic synthesizing unit and the calculating the matching score by the determination unit, in order to perform matching between the first image and the second image that is not identical to the first image, and
search for the other target resolution with the smaller value that separates the first distribution from the second distribution in the target resolutions.
3. The image matching device according to claim 1, wherein the regulation unit is configured to determine whether or not the first distribution is separated from the second distribution based on whether or not the first distribution and the second distribution satisfy a predetermined condition.
4. The image matching device according to claim 1, wherein the regulation unit is configured to display the first distribution and the second distribution on a display device, and determine whether or not the first distribution is separated from the second distribution in accordance with a user input that is input from an input device.

5. The image matching device according to claim 1, wherein the determination unit is configured to, in a case where the matching score satisfies a predetermined reference value, generate a matching result indicating that the first image matches the second image.

6. The image matching device according to claim 1, further comprising an output unit configured to output a result of the matching by the determination unit.

7. An image matching method for performing matching between a first image and a second image, the image matching method comprising:
   acquiring a frequency characteristic of the first image and a frequency characteristic of the second image;
   synthesizing the frequency characteristic of the first image and the frequency characteristic of the second image to generate a synthesized frequency characteristic;
   performing frequency transformation on the synthesized frequency characteristic to calculate a correlation coefficient map whose resolution coincides with a target resolution among a plurality of target resolutions;
   performing matching between the first image and the second image based on a matching score calculated from the correlation coefficient map; and
   regulating the target resolution based on the matching score,
   wherein in the regulating, another target resolution is searched for, with a smaller value than the target resolution, separating a first distribution from a second distribution, the first distribution being a distribution of the matching score when the first image and the second image are identical, the second distribution being a distribution of the matching score when the first image and the second image are not identical.

8. The image matching method according to claim 7, wherein in the searching for other the target resolution;
   an operation is repeated while target resolutions are varied, the operation being, under one of the target resolutions, calculating the first distribution by the acquiring, the synthesizing, the calculating the correlation coefficient map and the calculating the matching score, in order to perform matching between the first image and the second image that is identical to the first image, and calculating the second distribution by the acquiring, the synthesizing, the calculating the correlation coefficient map and the calculating the matching score, in order to perform matching between the first image and the second image that is not identical to the first image, and the target resolution with the smaller value that separates the first distribution from the second distribution is searched for in the target resolutions.

9. The image matching method according to claim 7, wherein in the regulating, whether or not the first distribution is separated from the second distribution is determined based on whether or not the first distribution and the second distribution satisfy a predetermined condition.

10. The image matching method according to claim 7, wherein in the regulating, the first distribution and the second distribution are displayed on a display device, and it is determined whether or not the first distribution is separated from the second distribution in accordance with a user input that is input from an input device.

11. The image matching method according to claim 7, wherein in the matching, in a case where the matching score satisfies a predetermined reference value, a matching result indicating that the first image matches the second image is generated.

12. The image matching method according to claim 7, wherein in the matching, a result of the matching is output.

13. A non-transitory computer-readable recording medium having a program recorded thereon, the program comprising instructions for causing a computer that performs matching between a first image and a second image to functions as:
   a frequency characteristic acquisition unit configured to acquire a frequency characteristic of the first image and a frequency characteristic of the second image;
   a frequency characteristic synthesizing unit configured to synthesize the frequency characteristic of the first image and the frequency characteristic of the second image to generate a synthesized frequency characteristic;
   a determination unit configured to perform frequency transformation on the synthesized frequency characteristic to calculate a correlation coefficient map whose resolution coincides with a target resolution among a plurality of target resolutions, and perform matching between the first image and the second image based on a matching score calculated from the correlation coefficient map; and
   a regulation unit configured to regulate the target resolution based on the matching score,
   wherein the regulation unit is configured to search for another target resolution, with a smaller value than the target resolution, that separates a first distribution from a second distribution, the first distribution being a distribution of the matching score when the first image and the second image are identical, the second distribution being a distribution of the matching score when the first image and the second image are not identical.

* * * * *